United States Patent [19]

Nonaka

[11] Patent Number: 5,680,648

[45] Date of Patent: Oct. 21, 1997

[54] LIGHT PROJECTION TYPE DISTANCE MEASURING DEVICE FOR AUTO-FOCUSING IN CAMERA

[75] Inventor: Osamu Nonaka, Sagamihara, Japan

[73] Assignee: Olympus Optical Co., Ltd., Tokyo, Japan

[21] Appl. No.: 338,250

[22] Filed: Nov. 14, 1994

[30] Foreign Application Priority Data

Nov. 15, 1993 [JP] Japan ................... 5-285207
Dec. 9, 1993 [JP] Japan ................... 5-309365

[51] Int. Cl.⁶ ................................................ G03B 7/78
[52] U.S. Cl. ................ 396/109; 396/106; 396/89; 396/121; 396/25
[58] Field of Search .......................... 354/400, 401, 354/403, 429–432, 64, 415; 396/89, 104, 105, 106, 109, 121, 25

[56] References Cited

U.S. PATENT DOCUMENTS

| 4,470,681 | 9/1984 | Johnson . | |
|---|---|---|---|
| 4,485,398 | 11/1984 | Cherin et al. | 358/50 |
| 4,514,084 | 4/1985 | Makino et al. . | |
| 4,571,048 | 2/1986 | Sugawara . | |
| 4,582,424 | 4/1986 | Kawabata . | |
| 4,664,495 | 5/1987 | Alyfuka et al. | 354/430 |
| 5,270,765 | 12/1993 | Kunishigi | 354/403 |
| 5,335,030 | 8/1994 | Suzuka | 354/149.1 |
| 5,438,363 | 8/1995 | Ejima et al. | 348/223 |
| 5,448,331 | 9/1995 | Hamada et al. | 354/403 |

FOREIGN PATENT DOCUMENTS

| 57-144409 | 9/1982 | Japan . |
|---|---|---|
| 59-107332 | 6/1984 | Japan . |
| 63-266410 | 11/1988 | Japan . |
| 64-57246 | 3/1989 | Japan . |
| 5-8596 | 3/1993 | Japan . |

*Primary Examiner*—Daniel P. Malley
*Attorney, Agent, or Firm*—Frishauf, Holtz, Goodman, Langer & Chick

[57] ABSTRACT

A light-emitting section projects distance measurement light toward an object to be photographed. A switching section sequentially switches the projection direction of the distance measurement light projected from the light-emitting section. A first light-receiving section is arranged at a position separated from the light-emitting section by a first base length. The first light-receiving section receives a reflected light beam of the distance measurement light from the object and outputs a first signal corresponding to the incident position of the reflected light beam. The second light-receiving section receives a reflected light beam of the distance measurement light from the object and outputs a second signal corresponding to the incident position of the reflected light beam. An object distance calculating section calculates the object distance in accordance with first and second signals corresponding to the incident positions and output from the first and second light-receiving sections.

26 Claims, 21 Drawing Sheets

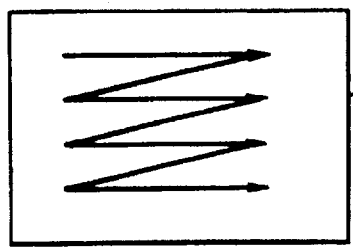
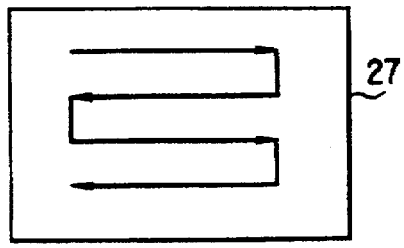
FIG. 9A          FIG. 9B
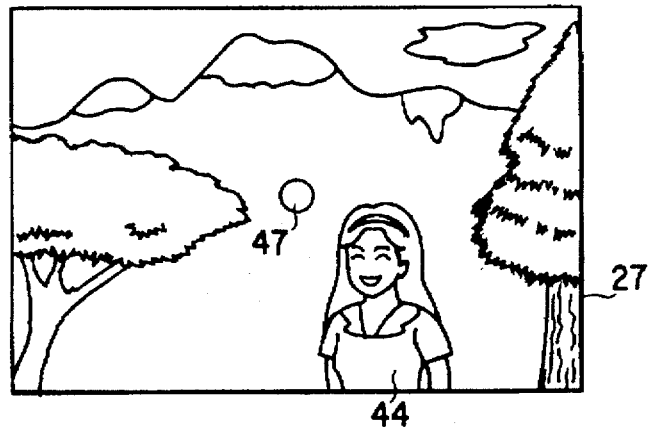
FIG. 10
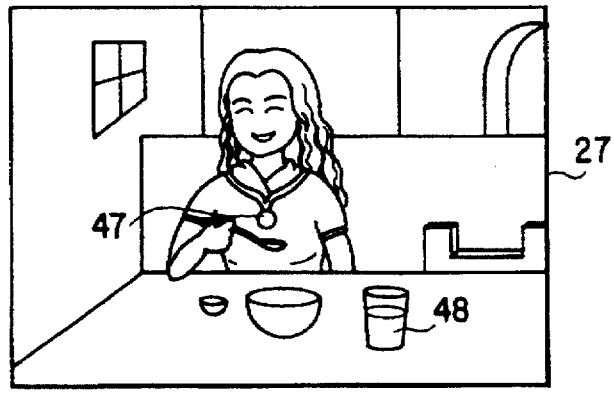
FIG. 11

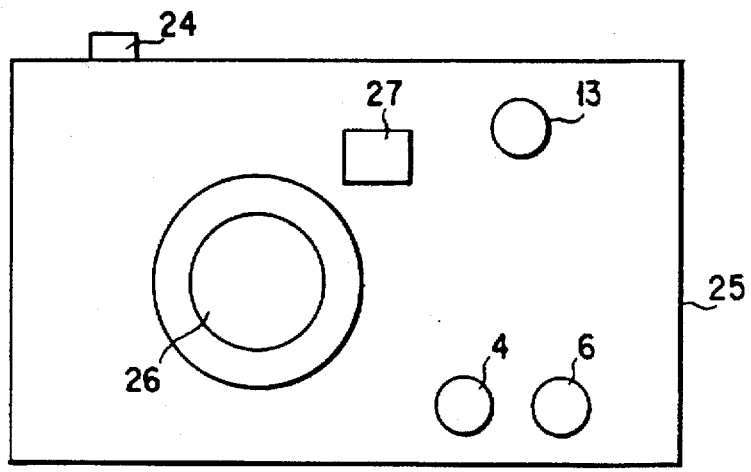
F I G. 12A
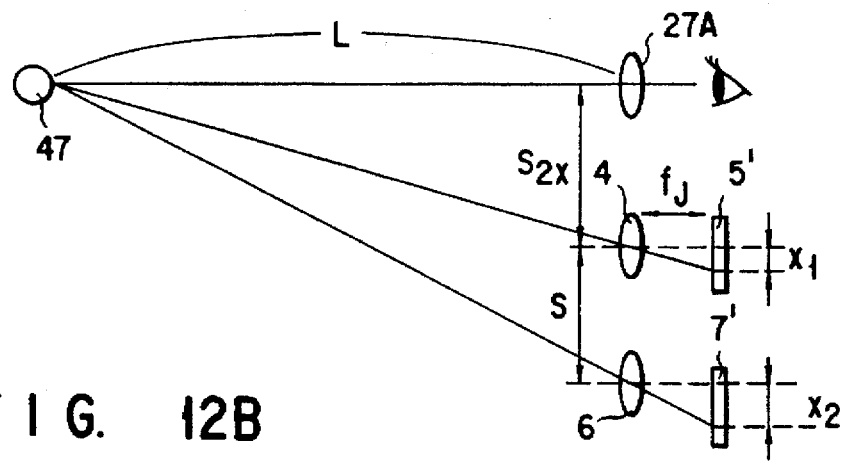
F I G. 12B
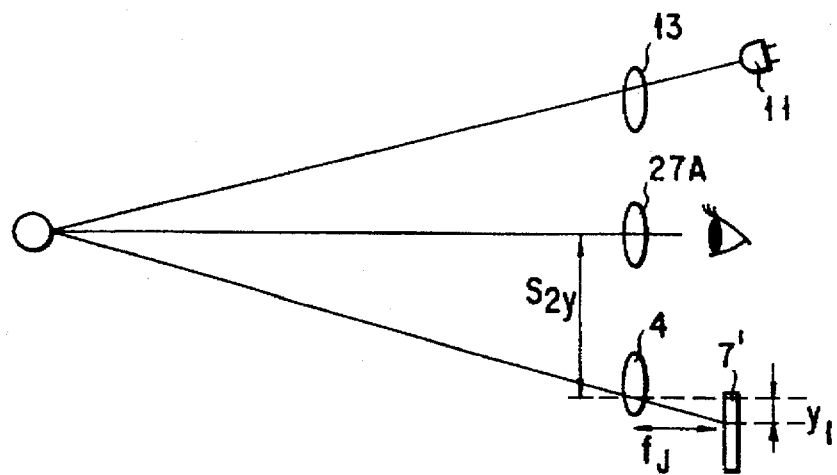
F I G. 12C

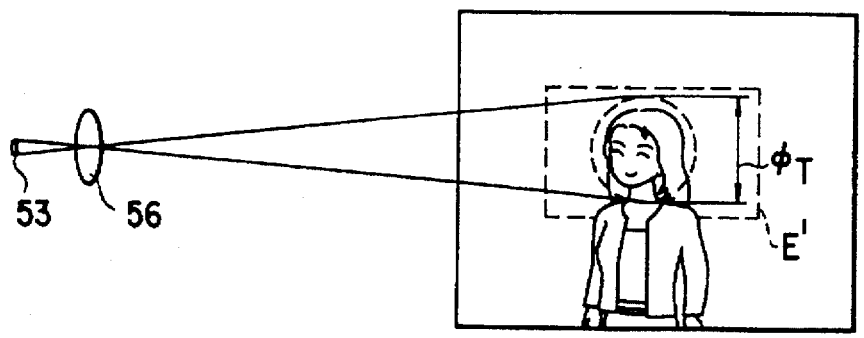
F I G. 19
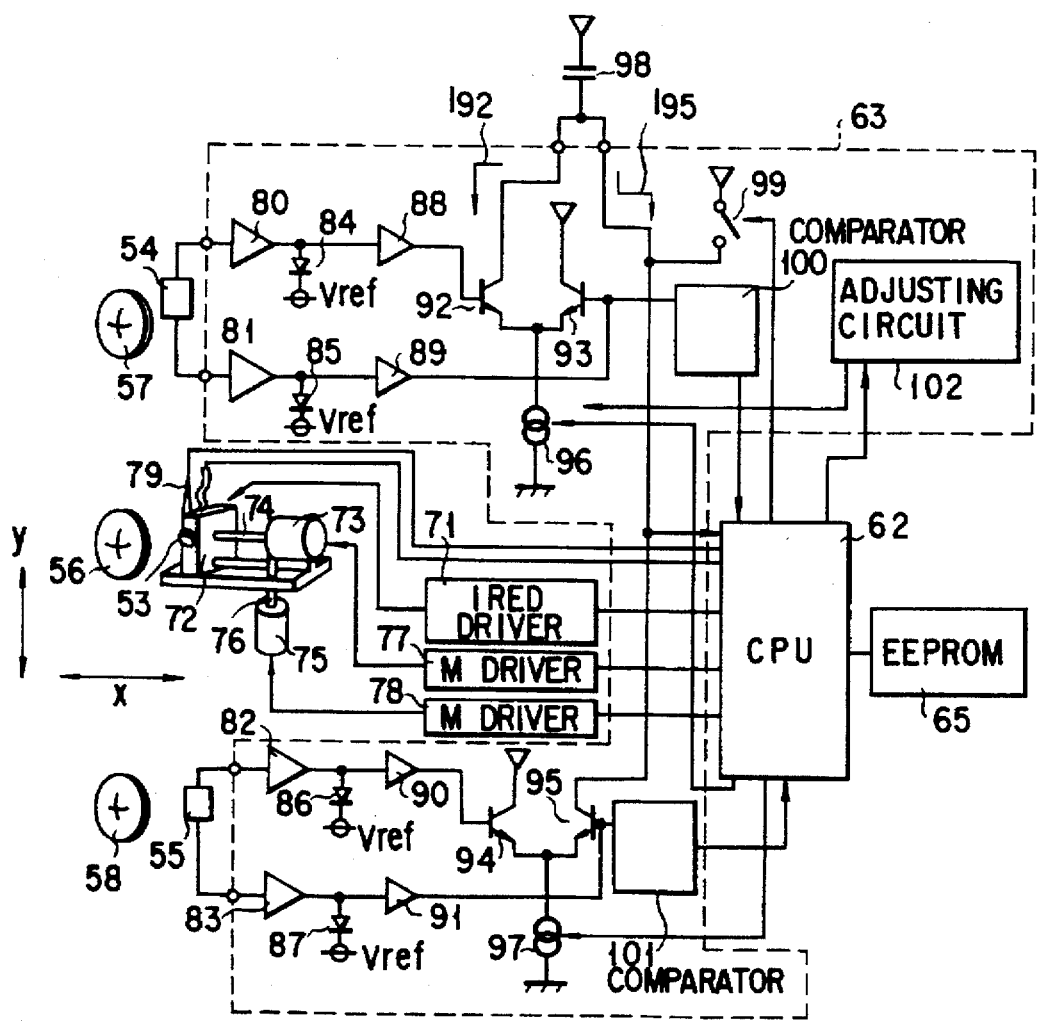
F I G. 20

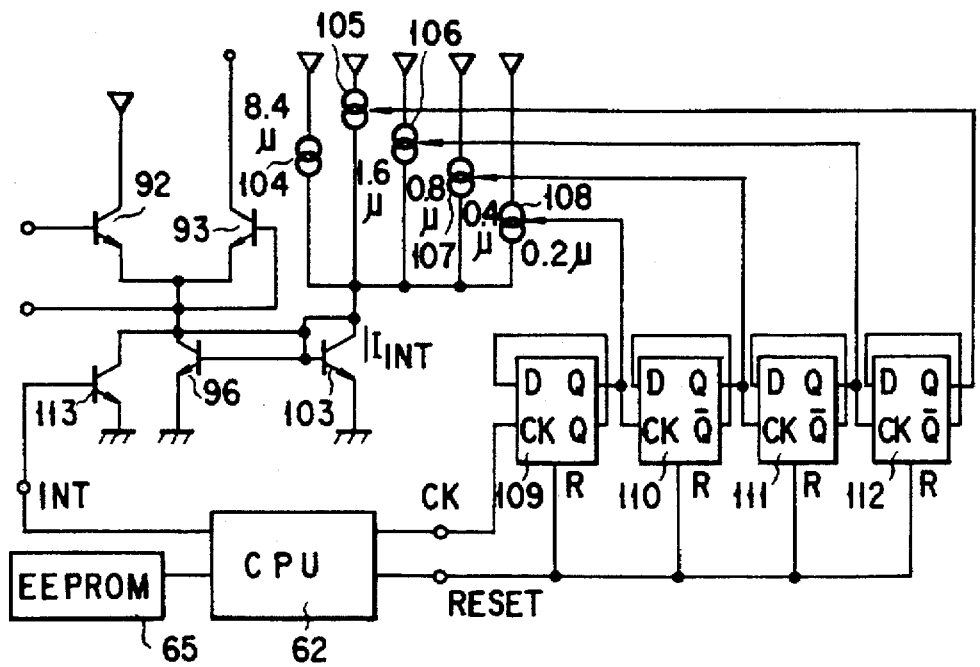
FIG. 21A
| CK COUNT | $I_{INT}$ |
|---|---|
| 0 | 8.4 μ |
| 1 | 8.6 μ |
| 2 | 8.8 μ |
| 3 | 9.0 μ |
| ⋮ | ⋮ |
| 8 | 10 μ |
| ⋮ | ⋮ |
| 13 | 11.0 μ |
| 14 | 11.2 μ |
| 15 | 11.4 μ |
FIG. 21B
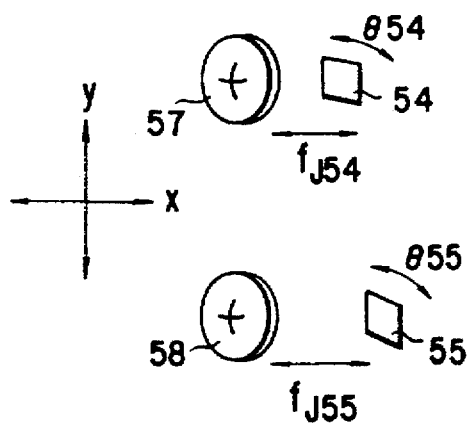
FIG. 21C

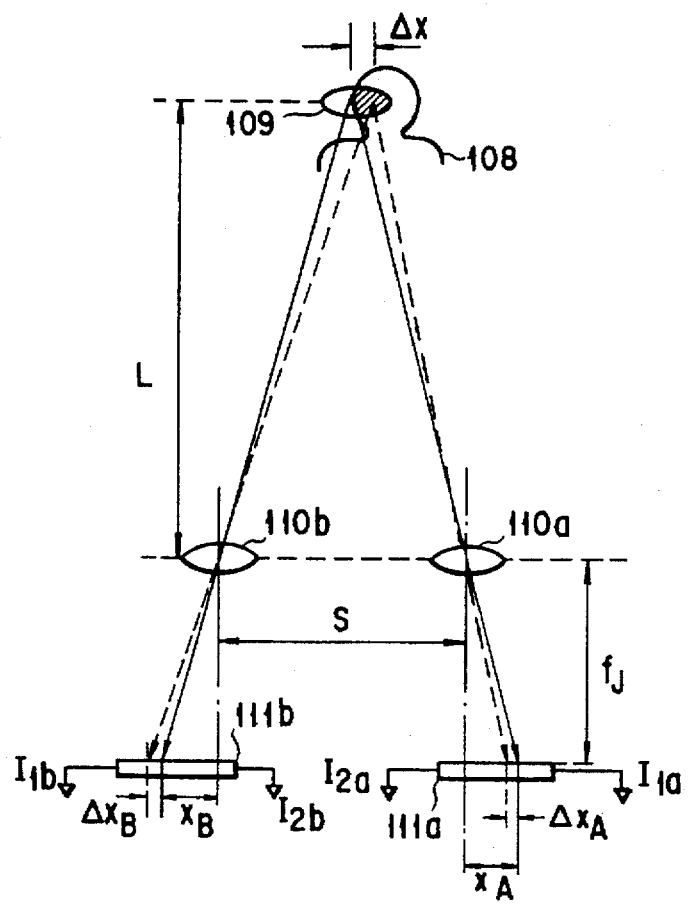
F I G. 26
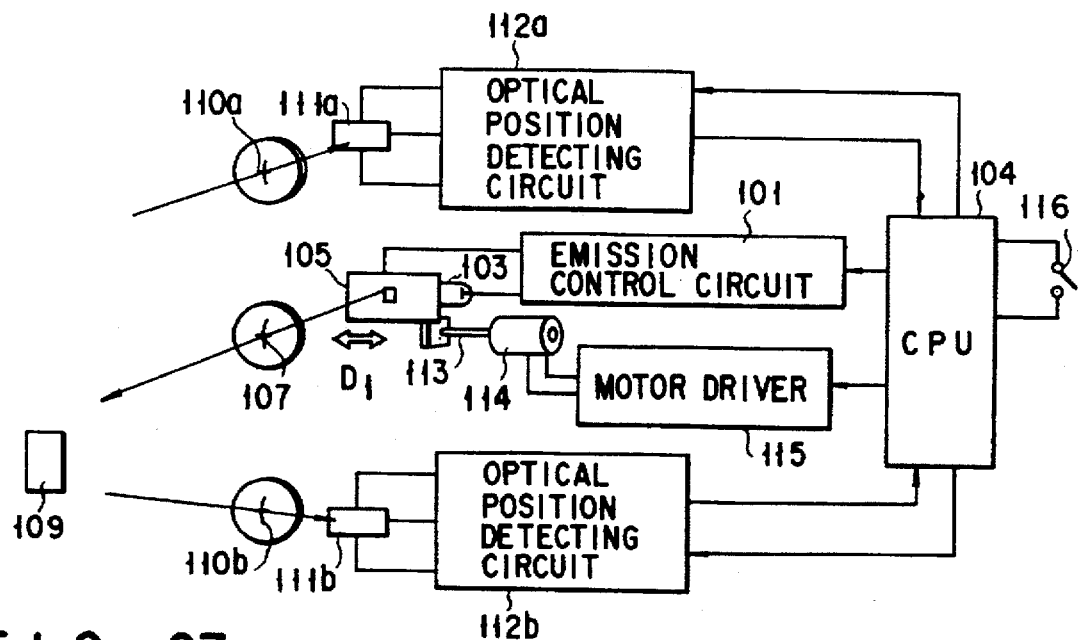
F I G. 27

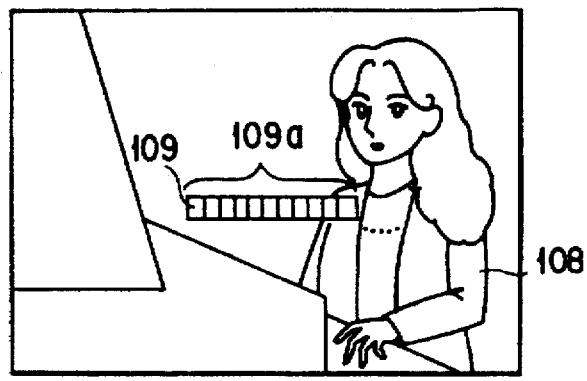
F I G. 28
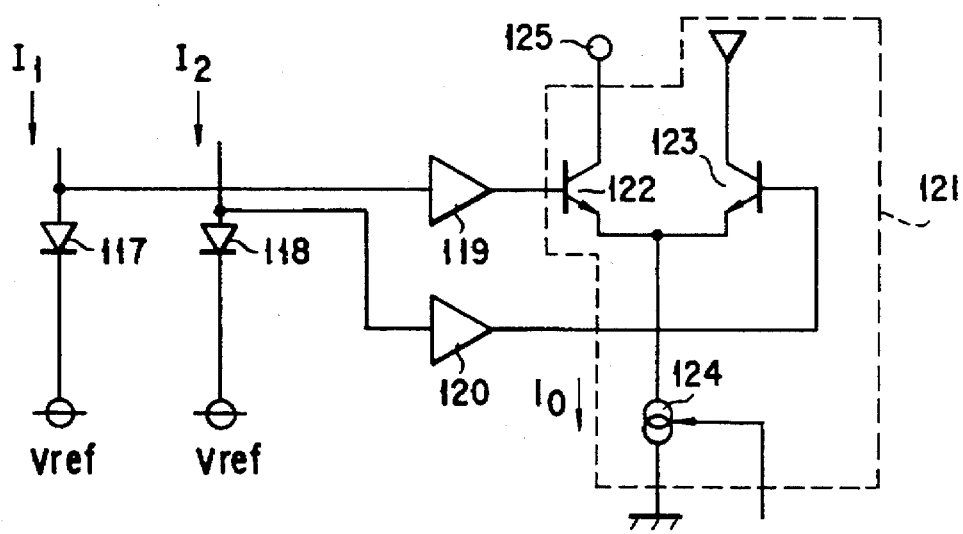
F I G. 30

LIGHT PROJECTION TYPE DISTANCE MEASURING DEVICE FOR AUTO-FOCUSING IN CAMERA

BACKGROUND OF THE INVENTION

1. Field of the Invention

The present invention generally relates to a camera and, more particularly, to a so-called light projection type distance measuring device for auto-focusing which radiates distance measurement light on an object to be photographed, and measures the object distance in accordance with reflected signal light of the distance measurement light.

2. Description of the Related Art

Many attempts have been made to focus a camera on an object (to be photographed) located at a position other than a central portion of the photographic frame with a one-touch operation in performing a photographing operation.

For example, the following technique is disclosed in U.S. Pat. No. 4,582,424. A plurality of light-emitting elements are prepared as distance measuring devices for auto-focusing. These elements are sequentially caused to emit light to allow distance measurement of corresponding points within the frame.

In this conventional technique, as the number of distance measurement points in the frame increases, a larger number of light-emitting elements are required, resulting in an increase in cost. For this reason, attempts have been made to perform distance measurement of each point in the frame by scanning one light-emitting element. For example, a technique of changing the relative positions of a light-emitting lens and a light-emitting element was disclosed in U.S. Pat. No. 4,470,681. Recently, a technique similar to the above technique has been disclosed in Jpn. Pat. Appln. KOKAI Publication No. 64-57246.

If, however, the relative positions of light-emitting and light-receiving lenses and light-emitting and light-receiving elements are changed, a backlash occurs, and a distance measurement error tends to occur.

A technique of solving such a problem is disclosed in Jpn. Pat. Appln. KOKAI Publication No. 59-107332. In this technique, light-emitting and light-receiving elements and lenses are scanned as a unit to prevent such a distance measurement error.

In order to move the overall unit including the light-emitting and light-receiving elements and lenses, a large actuator and a complicated mechanism are required. In addition, the scanning speed is decreased, and a time lag for distance measurement is prolonged, thus posing a serious problem.

As described above, a light projection type distance measuring device has been used as a distance measuring device for auto-focusing (to be referred to as AF hereinafter) applied to a camera. Such a light projection type AF device can perform distance measurement even in a dark place. However, this device is not suitable for distance measurement for a long distance because a reflected signal light beam reduces with an increase in object distance.

With the use of a light source capable of emitting a large amount of light, a distance measuring device can cope with distance measurement for a long distance. For this reason, a technique of using a xenon tube (Xe tube), which is used for an electronic flash unit in a camera, as a light source has been proposed.

A distance measuring device used for a general camera uses an infrared-emitting diode (IRED) as a light source. Problems are left unsolved in the simple use of a Xe tube in place of an IRED.

One of the problems is that it is difficult to properly perform distance measurement of a small object to be measured because the Xe tube has a diameter as large as about 1 mm compared with the IRED having an emission area of about 0.4 mm. For example, in the technique disclosed in Jpn. Pat. Appln. KOKAI Publication No. 57-144409, strong directivity is set for the light-receiving side to provide countermeasures against the problem of a large tube diameter.

In Jpn. Pat. Appln. KOKAI Publication No. 63-266410, there is disclosed a device which uses a Xe tube only for a special case, i.e., distance measurement for a long distance, and performs distance measurement for a long distance by checking whether the amount of reflected light is small or large.

In contrast to this, a distance measuring device disclosed in Jpn. UM Appln. KOKOKU Publication No. 5-8596 performs distance measurement of various points, instead of one point, by using the fact that the Xe tube can radiate light over a wide range.

The above device disclosed in Jpn. Pat. Appln. KOKAI Publication No. 63-266410, however, cannot perform accurate distance measurement because a reflected signal light beam changes as a remote object changes in size. In addition, the amount of light emitted from the Xe tube changes for each light-emitting operation, unlike the IRED. Even if, therefore, the same object is assumed, it cannot be said that the distance measurement precision is sufficient.

In the devices disclosed in Jpn. Pat. Appln. KOKAI Publication No. 57-144409 and Jpn. UM Appln. KOKOKU Publication No. 5-8596, since the light-receiving means is divided into small pieces to have strong directivity, the same number of processing circuits for light-receiving operations as the division number are required, and the arrangement of the device is complicated. In addition, the cost of the device increases.

Furthermore, slight movement of the emission point of the Xe tube poses another problem, which is not recognized in the above official gazettes, and against which no countermeasures have been taken.

The Xe tube emits light by using an electric charge in a xenon gas sealed in a glass tube. The electric discharge path changes for each light-emitting operation depending on a temperature distribution and the like in the tube. This leads to a change in the center of gravity of distance measurement light. Therefore, some countermeasures need to be taken again such a phenomenon when the Xe tube is applied to a so-called light projection type trigonometric distance measuring device for performing distance measurement in accordance with the incident positions of reflected signal light beams.

SUMMARY OF THE INVENTION

The present invention has been made in consideration of the problems of the related art, and has as its object to provide a light projection type distance measuring device for auto-focusing in a camera which can perform high-precision distance measurement of a plurality of points within the photographic frame at a high speed.

The present invention has been made in consideration of the problems of the related art, and has as its another object to provide a light projection type distance measuring device for auto-focusing in a camera which provides countermeasures against slight movement of the emission point of a light source for light projection such as a Xe tube, and can perform high-precision distance measurement for even a long distance without being influenced by the size of an object to be photographed and changes in the amount of light emitted from the Xe tube.

According to one aspect of the present invention, there is provided a distance measuring device for a camera, comprising: light-emitting means for projecting distance measurement light toward an object to be photographed; switching means for sequentially switching a projection direction of the distance measurement light projected from the light-emitting means; first light-receiving means, arranged at a position separated from the light-emitting means by a first base length, for receiving a reflected light beam of the distance measurement light from the object and outputting a first signal corresponding to an incident position of the reflected light beam; second light-receiving means, arranged at a position separated from the light-emitting means by a second base length, for receiving a reflected light beam of the distance measurement light from the object and outputting a second signal corresponding to an incident position of the reflected light beam; and object distance calculating means for calculating a distance to the object in accordance with the first and second signals corresponding to the incident positions and output from the first and second light-receiving means.

According to another aspect of the present invention, there is provided a distance measuring device for a camera, comprising: flash means for emitting flash light as distance measurement light toward an object to be photographed by consuming energy charged in a capacitor; first light-receiving means, arranged at a position separated from the flash means by a first base length, for receiving a reflected light beam of the distance measurement light from the object and outputting a first signal corresponding to an incident position of the reflected light beam; second light-receiving means, arranged at a position separated from the flash means by a second base length, for receiving a reflected light beam of the distance measurement light from the object and outputting a second signal corresponding to an incident position of the reflected light beam; and object distance calculating means for calculating a distance to the object in accordance with the first and second signals corresponding to the incident positions and output from the first and second light-receiving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9A and 9B are views, each showing an example of how a distance measurement point is scanned;

FIG. 10 is a view showing a scene where an object is not present at a central portion of the frame;

FIG. 11 is a view showing a scene where a main object is present at a central portion of the frame, together with minor objects;

FIG. 12A is a front view showing a camera incorporating a distance measuring device according to the third embodiment of the present invention;

FIG. 12B is a schematic view obtained when the camera in FIG. 12A is viewed from above;

FIG. 12C is a schematic view showing the camera in FIG. 12A with respect to only the y-coordinates;

FIG. 19 is a view showing the relationship between an IRED and distance measurement light in the distance measuring device of the fourth embodiment;

FIG. 20 is a block diagram showing the arrangement of the distance measuring device to explain the fourth embodiment in more detail;

FIG. 21A is a circuit diagram for explaining an adjusting circuit 102 in FIG. 20 in detail;

FIG. 21B is a view showing the relationship between the CK count of a counter circuit and current values $I_{INT}$ flowing in the collectors of transistors 103 and 96;

FIG. 21C is a view showing the positional relationship between light-receiving lenses 57 and 58 and PSDs 54 and 55;

FIG. 26 is a view for explaining merits in AF based on a binocular light-receiving operation;

FIG. 27 is a block diagram showing the arrangement of a distance measuring device according to the sixth embodiment of the present invention;

FIG. 28 is a view showing a scene for which distance measurement of a plurality of points in the frame is performed;

FIG. 30 is a circuit diagram showing an optical position detecting circuit in FIG. 27;

DETAILED DESCRIPTION OF THE PREFERRED EMBODIMENTS

Figure 1:
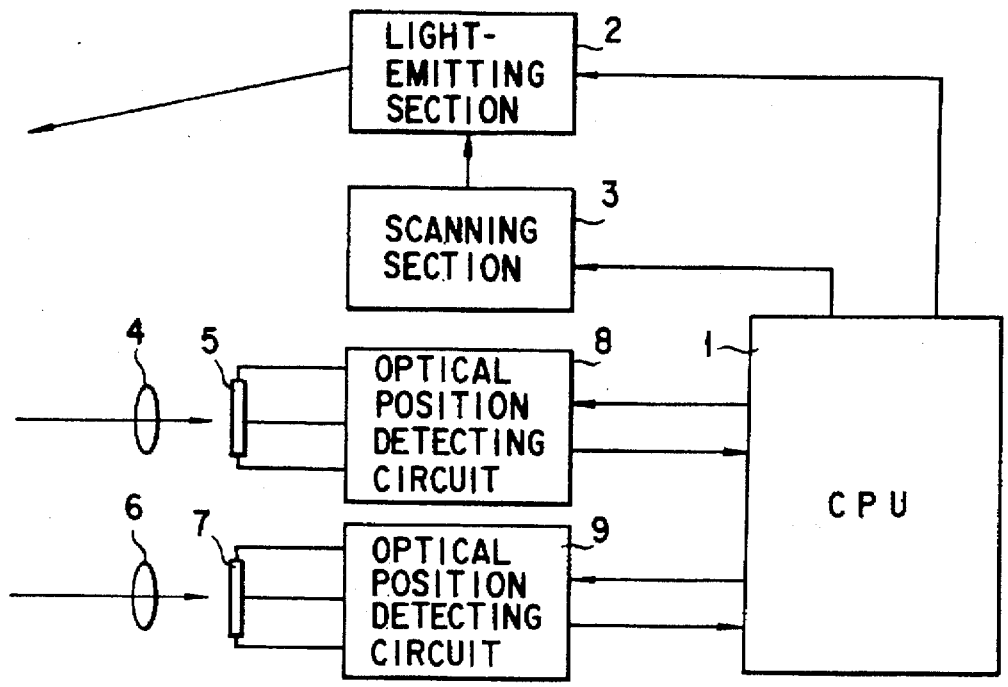
FIG. 1 is a block diagram showing the concept of a distance measuring device according to the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

FIG. 1 is a block diagram showing the concept of a distance measuring device according to the first embodiment of the present invention. Referring to FIG. 1, a central processing unit (CPU) 1 constituted by a one-chip microcomputer and the like controls a light-emitting section 2 as a means for radiating distance measurement light on an object to be photographed and a scanning section 3 for scanning the light-emitting section 2. A semiconductor optical position sensing device (PSD) 5 is arranged behind a light-receiving lens 4. Similarly, a PSD 7 is arranged behind a light-receiving lens 6. Outputs from these PSDs 5 and 7 are input to the CPU 1 via optical position detecting circuits 8 and 9.

In this arrangement, distance measurement light is radiated from the light-emitting section 2 onto an object (not shown). At this time, the light-emitting section 2 is controlled and scanned by the CPU 1 via the scanning section 3 such that the light-emitting direction of the light-emitting section 2 is changed. With this operation, distance measurement of each point in the photographic frame can be performed.

The distance measurement light projected by the light-emitting section 2 is reflected by the object (not shown) to form light spots on the PSDs 5 and 7 via the two light-receiving lenses 4 and 6, respectively. The incident positions of the light spots are calculated by the optical position detecting circuits 8 and 9 on the basis of output signals from the two PSDs 5 and 7. An object distance is then calculated by the CPU 1 on the basis of outputs from the optical position detecting circuits 8 and 9.

Figure 2:
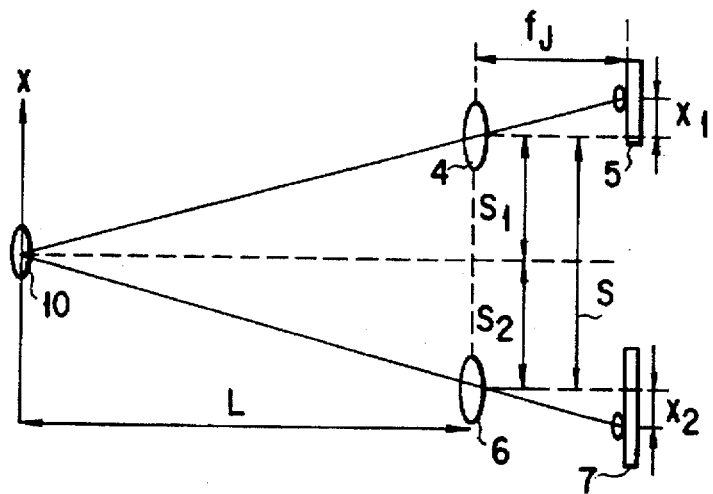
FIG. 2 is a view showing the principle of distance measurement in the distance measuring device of the present invention.

FIG. 2 shows the principle of distance measurement performed by the distance measuring device of the present invention. Referring to FIG. 2, reference numeral 10 denotes a distance measurement beam spot radiated on the object. The light-receiving lenses 4 and 6 are arranged at a position separated from the distance measurement beam spot 10 by a distance L. The PSDs 5 and 7 are respectively arranged behind the light-receiving lenses 4 and 6. Letting $f_j$ be the distance between the light-receiving lenses 4 and 6 and the PSDs 5 and 7, and $x_1$ and $x_2$ be the positions of the light spots on the PSDs 5 and 7 with respect to the optical axis references of the respective lenses, the following equations are established:

$$L \cdot f_j = S_1 \cdot x_1,$$

$$L \cdot f_j = S_2 \cdot x_2,$$

$$S_1 = L \cdot x_1/f_j \quad (1)$$

$$S_2 = L \cdot x_2/f_j \quad (2)$$

$$S = S_1 + S_2 = (L/f_j)(x_1 + x_2) \quad (3)$$

$$L = (S \cdot f_j)/(x_1 + x_2) \quad (4)$$

$S_1$ and $S_2$ are respective base lengths, as shown in FIG. 2.

If, therefore, the positions $x_1$ and $x_2$ are respectively detected by the PSDs 5 an 7, since S and $f_j$ are fixed values, the object distance L can be obtained.

Accurate distance measurement, therefore, can be performed regardless of the position of the distance measurement beam spot 10.

The second embodiment in which the distance measuring device of the present invention is applied to a camera will be described next.

Figure 3:
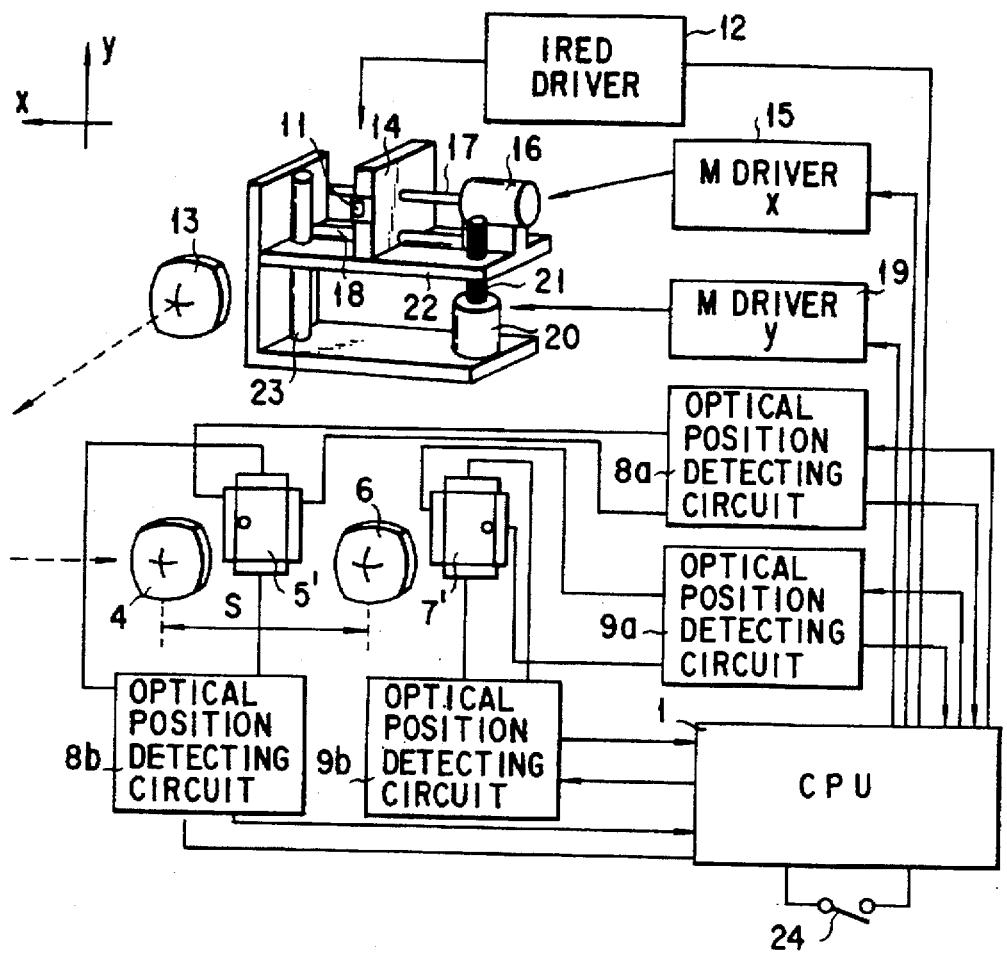
FIG. 3 is a block diagram showing the arrangement of the second embodiment of the present invention.

FIG. 3 is a block diagram showing the arrangement of the second embodiment of the present invention. In the first embodiment described above, as the PSDs 5 and 7, one-dimensional position sensing devices are used. The second embodiment, however, employs a mechanism for two-dimensionally scanning an IRED, and uses a PSD capable of a two-dimensional position detecting operation. According to the second embodiment, therefore, emission points (distance measurement beam points) can be arranged within the photographic frame of the camera.

The mechanism for two-dimensionally scanning the IRED will be described first. An IRED 11 is driven/ controlled by a CPU 1 via an IRED driver 12. A light-emitting lens 13 is arranged in front of the IRED 11. The IRED 11 is mounted on an IRED holding portion 14. The IRED 11 is slid along a guide rail 18 in the x direction in FIG. 3 by a motor 16 driven by a motor (M) driver 15 and a feed screw 17. The IRED 11 and the IRED holding portion 14 are slid along a guide rail 23 in the y direction in FIG. 3, together with a support portion 22, by a motor 20 driven by a motor (M) driver 19 and a feed screw 21.

PSDS 5' and 7', each capable of a two-dimensional position detecting operation, are arranged behind light-receiving lenses 4 and 6 at positions separated therefrom by a base length S. An output from the PSD 5' is supplied to a CPU 1 via optical position detecting circuits 8a and 8b. An output from the PSD 7' is supplied to the CPU 1 via optical position detecting circuits 9a and 9b. Note that reference numeral 24 denotes a switch for inputting a distance measurement start timing. In general, the switch 24 serves also as a release switch.

Figures 4A, 4B:
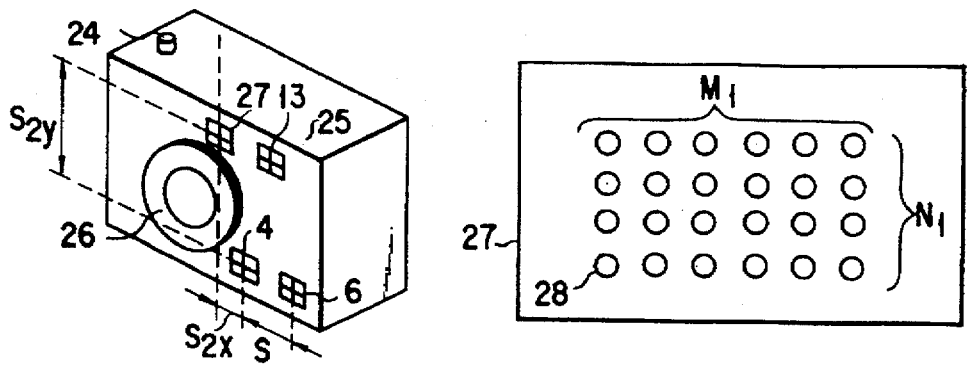
FIG. 4A is a perspective view showing the outer appearance of a camera incorporating the distance measuring device shown in FIG. 3.
FIG. 4B is a view showing a case wherein a distance measurement point changes its position two-dimensionally on the photographic frame (finder)

FIG. 4A is a perspective view showing the camera incorporating the distance measuring device shown in FIG. 3. Referring to FIG. 4A, the release switch 24 is arranged on the upper surface of a camera body 25. A photographing lens 26 is arranged in substantially the center of the front surface of the camera, and the window of a finder 27, the light-emitting lens 13, and the light-receiving lenses 4 and 6 are arranged around the photographing lens 26, as shown in FIG. 4A.

In this arrangement, when the motor 16 is rotated by the M driver 15, the IRED holding portion 14 is slid along the guide rail 18 in the x direction by the feed screw 17. The support portion 22 is movable along the guide rail 23 so that the IRED 11 is scanned in the y when the motor 20 driven by the M driver 19 rotates the feed screw 21. The CPU 1 causes the IRED 11, via the IRED driver 12, to emit light while controlling the M drivers 15 and 19 in accordance with a predetermined sequence.

Distance measurement light from the IRED 11 is radiated on an object (not shown) via the light-emitting lens 13. Since this distance measurement light is projected in a direction to connect the position of the IRED 11 to the principal point of the light-emitting lens 13, a distance measurement point 28 on the photographic frame (finder) two-dimensionally changes, as shown in FIG. 4B, every time the position of the IRED 11 shifts in the x and y directions.

In synchronism with the emission of light from the IRED 11, the positions of signal light beams which are reflected by the object and incident on the PSDs 5' and 7' via the light-receiving lenses 4 and 6 are detected by the optical position detecting circuits 8a, 8b, 9a, and 9b on the basis of the outputs from the two PSDs 5' and 7'. The CPU 1 calculates the distances from the respective points in the frame to the object on the basis of outputs from these optical position detecting circuits 8a, 8b, 9a, and 9b.

Each optical position detecting circuit in FIG. 3 will be described below with reference to FIG. 5.

Output currents $i_1$ and $i_2$ are output from the two output terminals of a PSD 30 and are respectively supplied to the bases of npn transistors 35 and 36, which constitute a differential operation circuit together with a constant-current source 37, via preamplifiers 31 and 32, compression diodes 33 and 34, and buffers 35 and 36. The transistors 38 and 39 having a common emitter are connected to the constant-current source 37. The collector of the transistor 39 is connected to a power supply via an integral capacitor 40 and connected to the CPU 1 via a switch 41 and a terminal 42. Note that a known background light removing circuit 43 for removing a background light current is connected to the output terminals of the PSD 30.

Figure 5:
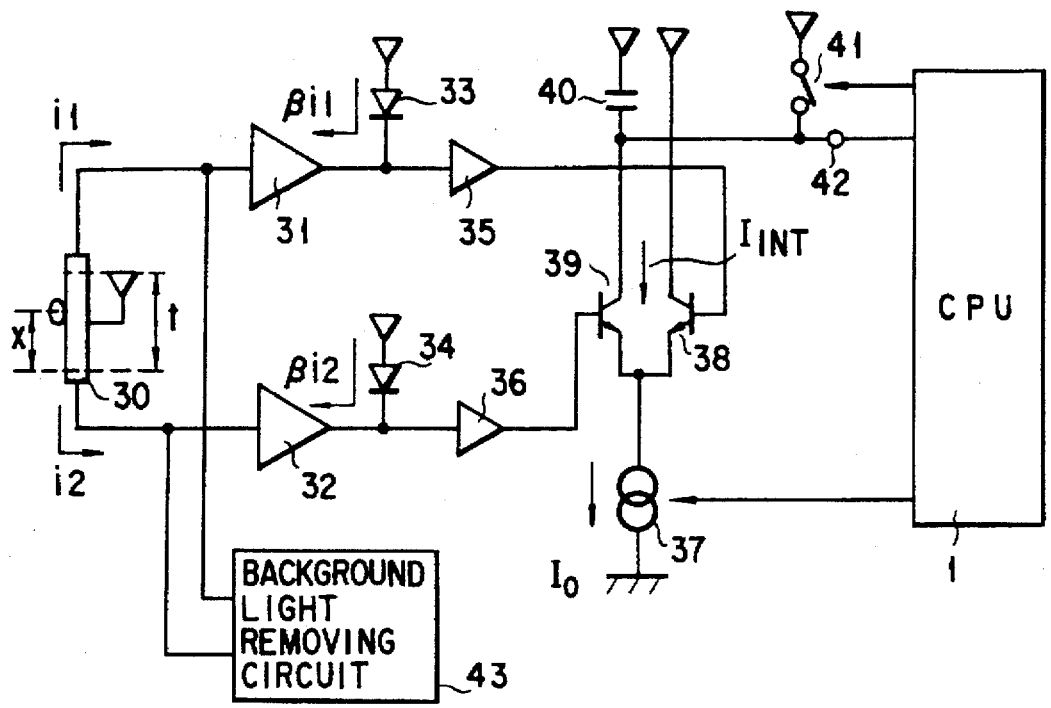
FIG. 5 is a circuit diagram showing the detailed arrangement of an optical position detecting circuit in FIG. 3.

Assume that a signal light beam is incident on the PSD 30 having a width $t$ at a position $x$, as shown in FIG. 5. The two output currents $i_1$ and $i_2$ are dependent on the beam position $x$ and the width $t$ and satisfy the following relation:

$$i_1/(i_1+i_2)=x/t \tag{5}$$

In addition to the signal light beam, however, background light is incident on the PSD 30. The output currents $i_1$ and $i_2$ in equation (5) cannot be obtained without removing this background light. For this reason, the background light removing circuit 43 is connected to the output terminals of the PSD 30.

The signal light beam currents $i_1$ and $i_2$ are respectively amplified β times by the preamplifiers 31 and 32, and flow in the compression diodes 33 and 34, as shown in FIG. 5. Voltages generated in the compression diodes 33 and 34 are input to the differential operation circuit via the buffers 35 and 36. The constant-current source 37 controlled by the CPU 1 supplies a current $I_0$ in synchronism with the emission of light from the IRED 11, i.e., incidence of a signal light beam. The potentials at the two output terminals of the integral capacitor 40 are equally initialized to a power supply voltage vcc by the switch 41 before the emission of light from the IRED 11. This switch 41 is turned off in synchronism with the emission of light from the IRED 11.

With the circuit having the above arrangement, the output currents $i_1$ and $i_2$ from the PSD 30 are related to a current $I_{INT}$ as follows:

$$\begin{aligned} I_{INT} &= (i_1/(i_1+i_2))\times I_0 \\ &= (x/t)I_0 \end{aligned} \tag{6}$$

The current $I_{INT}$ is integrated by the integral capacitor 40 for a predetermined period of time. Therefore, by detecting a voltage at the terminal 42, the CPU 1 can calculate the incident position $x$ of the signal light beam according to the following equation:

$$x=t\cdot I_{INT}/I_0 \tag{6'}$$

The optical position detecting circuits 8a, 8b, 9a, and 9b shown in FIG. 3 detect the positions of light beams incident on the PSDs 5' and 7' according to the above-described principle.

A technique of obtaining an object distance L from the positions of signal light beams on these PSDs will be described next with reference to FIG. 6A.

The principle of distance measurement by a one-dimensional light-emitting/scanning operation in the x direction has been described above with reference to FIG. 2. This embodiment, however, is associated with an autofocusing operation corresponding to a two-dimensional light-emitting/scanning operation which is performed in consideration of a change in the distance measurement point in the y direction as well as in the x direction. That is, when an angle θ defined by the optical axes of the light-receiving lenses 4 and 6 and the distance measurement point in FIG. 6A is given as θ=0, equation (4) described above with reference to FIG. 2 is established.

Figure 6A:
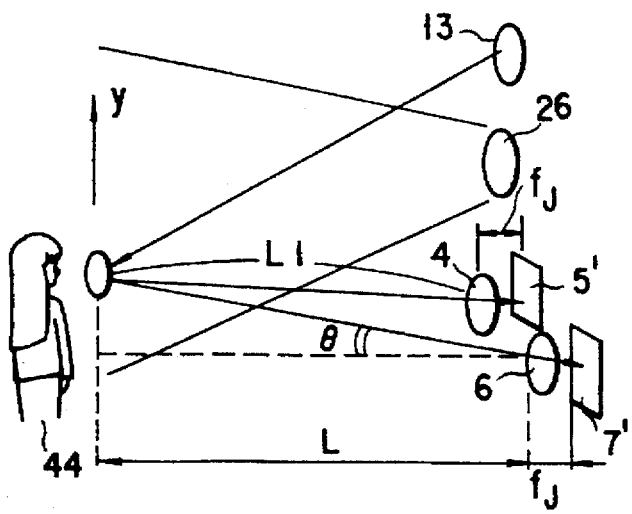
FIG. 6A is a view for explaining a method of obtaining an object distance L by using the optical position detecting circuit in FIG. 3 and the positions of signal light beams on PSDs.

Referring to FIG. 6A, according to equation (4), $$L_1=S\cdot f/(x_1+x_2) \tag{7}$$

Therefore, $$L=L_1\cos\theta \tag{8}$$

As is apparent, if the angle θ is detected, the object distance L can be obtained from the positions $x_1$ and $x_2$ according to equation (7).

Figure 6B:
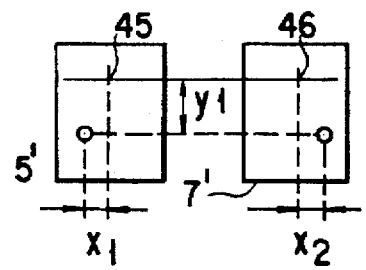
FIG. 6B is a view showing light spot positions on the PSDs in a direction (x) in which the principal points of light-receiving lenses are connected to each other, and a direction (y) perpendicular to the above direction.

A distance measurement light beam radiated on an object 44 via the light-emitting lens 13 forms light spots on the two PSDs 5' and 7', as shown in FIG. 6B, provided that the light-receiving lenses 4 and 6 are arranged in the manner shown in FIG. 6A, and the two-dimensional PSDs 5' and 7' are aligned with each other in the y direction so that they can detect light spot positions in a direction (x direction) to connect the principal points of the light-receiving lenses 4 and 6 and the y direction perpendicular thereto.

Referring to FIG. 6A, if both the distances from the two light-receiving lenses 4 and 6 to the two PSDs 5' and 7' are $f_j$, the following equation is established between the above angle $\theta$ and a position $Y_1$ of the light spots with reference to positions 45 and 46 of the lens optical axes on the PSDs:

$$\tan\theta = y_1/f_j \quad (9)$$

According to this equation, the object distance L can be calculated from the light spot positions $x_1$ and $x_2$ in the x direction and $Y_1$ in the y direction, as follows:

$$L = \{S \cdot f_j/(x_1+x_2)\} \cdot \cos\{\arctan(y_1/f_j)\} \quad (10)$$

As shown in FIG. 3, therefore, when the CPU 1 and the optical position detecting circuits 8a, 8b, 9a, and 9b calculate the positions $x_1$, $x_2$, and $Y_1$ on the basis of outputs from the two-dimensional PSDs 5' and 7', the CPU 1 can obtain an object distance according to equation (10).

Note that as an optical position detecting circuit, the circuit shown in FIG. 5 is used. Although the position $Y_1$ can be detected by either of the PSDs, the detection precision for the position $Y_1$ is improved by employing control based on the flow chart shown in FIG. 7.

The scan AF operation of this distance measuring device will be described next with reference to the flow charts shown in FIGS. 7 and 8.

Figure 7:
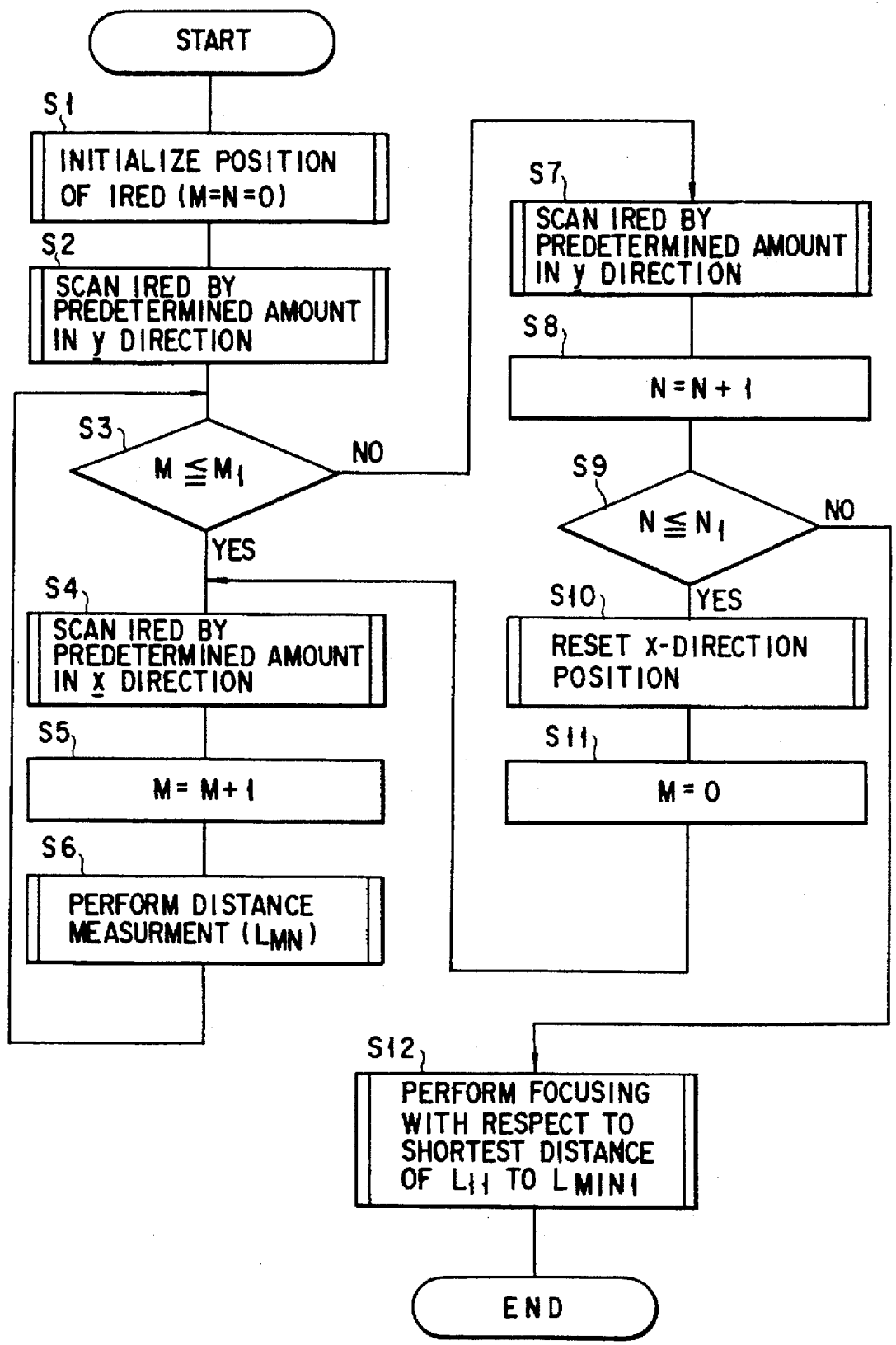
FIG. 7 is a flow chart for explaining the scanning AF operation of the distance measuring device.

Referring to FIG. 7, in step S1, the motors 19 and 20 in FIG. 3 are reversed to initialize the position of the IRED 11, and at the same time, M=0 and N=0 are set. In step S2, the first distance measurement coordinate in the y direction is determined. In step S3, it is checked whether the number of points having undergone scanning distance measurement exceeds a value $M_1$.

If NO in step S3, the flow advances to step S4 to scan the IRED 11 in the x direction by a predetermined amount. In step S5, a value M is incremented. In step S6, distance measurement is performed. The flow then returns to step S3. In this manner, in steps S3 to S6, distance measurement is sequentially performed at $M_1$ portions in the x direction, as shown in FIG. 4B.

If it is determined in step S3 that a series of scanning operations in the x direction is completed, the flow branches to step S7 to determine the next distance measurement of y-coordinates. After a value N is incremented in step S8, it is checked in step S9 whether the number of points having undergone scanning distance measurement is equal to or smaller than a value $N_1$.

If the number of points having undergone scanning distance measurement does not exceed the value $N_1$, the flow advances to step S10 to reset the position in the x direction. In step S11, the value M is also initialized. The flow then returns to step S4 to perform distance measurement at $M_1$ portions in the x direction in the same manner as described above. This operation is repeated until it is determined in step S9 that distance measurement at $N_1$ portions in the y direction is completed. In step S12, focusing is performed in accordance with the nearest distance measurement result of the obtained distance measurement results $L_{11}$ to $L_{MIN1}$.

According to this flow chart, as shown in FIG. 4B, $M_1 \times N_1$ distance measurement points can be arranged in the photographic frame.

It is difficult to detect light spot positions in the x and y direction at once by using the two-dimensional PSDs. In this embodiment, therefore, every time the IRED 11 is caused to emit light twice, light spot position coordinates in the x and y directions are detected. Note that the position detecting circuits connected to the different PSDs can be simultaneously operated.

Figure 8:
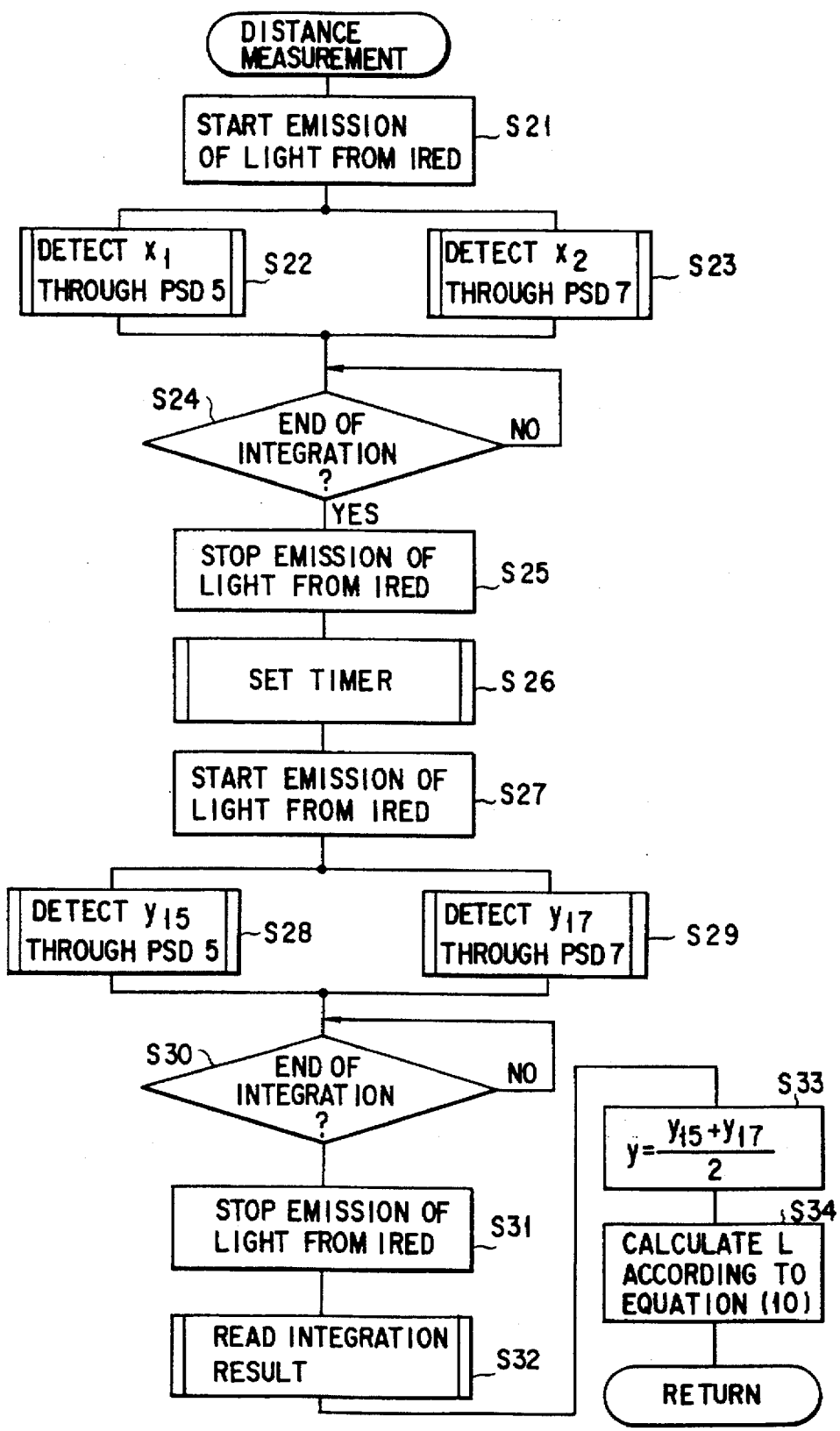
FIG. 8 is a flow chart for explaining the distance measuring operation in step S6 in FIG. 7.

In the subroutine for distance measurement in step S6 in FIG. 7, therefore, light spot positions are detected by the PSDs 5' and 7' at the same timing as in steps S22, S23, S28, and S29 in FIG. 8.

Referring to FIG. 8, in step S21, the IRED 11 is caused to start emitting light. In steps S22 and S23, the signal light beam incident positions $x_1$ and $x_2$ in the x direction are obtained at the same timing by using the optical position detecting circuits 8a, 8b, 9a, and 9b. More specifically, a voltage dependent on equation (6) is generated and held in the integral capacitor (denoted by reference numeral 40 in FIG. 5) of each of the optical position detecting circuits 8a, 8b, 9a, and 9b. In step S24, it is checked whether integration to be performed in each integral capacitor for a predetermined period of time is completed. If YES in step S24, the emission of light from the IRED 11 is ended in step S25.

Although the IRED 11 is caused to emit light again, a predetermined time interval is set by using a timer in step S26 to prevent a decrease in the amount of emitted light which is caused by an increase in the chip temperature of the IRED 11 due to consecutive light-emitting operations. In step S26, the CPU 1 performs A/D (analog/digital) conversion of the integral voltage held by each integral capacitor in steps S22 and S23, and loads the resultant data.

In step S27, the IRED 11 is caused to emit light again. In steps S28 and S29, signal light beam incident positions $Y_{15}$ and $Y_{17}$ in the y direction are respectively detected by the optical position detecting circuits 8b and 9b.

Similar to the detection in x direction described above, if it is determined in step S30 that integration to be performed for a predetermined period of time is completed, the flow advances to step S31 to end the emission of light from the IRED 11. In step S32, the integration results are read out again. In step S33, the signal light positions $Y_{15}$ and $Y_{17}$ obtained in the manner described above with reference to equation (6') are averaged to reduce the measurement error. In step S34, an object distance is obtained from the positions $Y_1$, $x_1$, and $x_2$ obtained in this manner by using equation (10).

In the above flow chart, distance measurement is performed in the manner shown in FIG. 9A. However, the present invention is not limited to this. For example, the distance measurement point may be changed in the manner shown in FIG. 9B. In the case shown in FIG. 9B, the time required for distance measurement can be further shortened.

With this distance measuring device, even in a scene where no object is present at a point on a central portion 47 of a frame in a finder 27, as shown in FIG. 10, the camera can be properly focused on a main object 44. As described above, according to this embodiment, there is provided a camera which can perform high-precision distance measurement of a plurality of points within the frame at a high speed, and can easily take a photograph in focus.

In addition, according to this embodiment, since distance measurement can be performed according to equation (10) regardless of a backlash in the movable portion of the IRED, no precise scanning position detecting means is required. That is, in initializing the IRED as in step S1 in the flow chart shown in FIG. 7, the position of the IRED may be coarsely detected, and the subsequent scanning operation to be performed by a predetermined amount may be controlled by controlling the ON time of the motor or the like. Therefore, no precise positioning is required unlike a case wherein a light-emitting portion is scanned by a conventional active trigonometric distance measurement scheme in which the distance between light-emitting and light-receiving portions is set as a base length.

Consider a scene where a main object is present at a central portion of the frame, as shown in FIG. 11. If the camera is simply focused on the nearest object, the camera is focused on a minor object 48, and the main object 44 goes out of focus. Since there are many occasions to photograph such a scene, a main object selection flow chart in which only a distance measurement result obtained at a central portion of the frame is specially processed may be considered. For example, an algorithm may be designed to select the nearest point only when no human figure is present in the center of the frame but only scenery is present. In this case, a distance measurement result obtained in the center of the frame exhibits the value of infinity.

As described above, according to the present invention, a distance measurement result in the center of the frame can be selected without using a precise positioning means. This scheme will be described below as the third embodiment of the present invention with reference to FIGS. 12A to 12C.

FIG. 12A is a front view of a camera incorporating a distance measuring device according to the third embodiment of the present invention. A release switch 24 is arranged on the upper surface of a camera body 25. A photographing lens 26 is arranged in substantially the center of the front surface of the camera, and the window of a finder 27, and light-emitting and light-receiving lenses 13, 4, and 6 of the distance measuring deice are arranged around the photographing lens 26, as shown in FIG. 12A.

FIG. 12B conceptually shows the camera in FIG. 12A from above. Referring to FIG. 12A, the two light-receiving lenses 4 and 6 are arranged with respect to the finder objective lens 27A. In this case, the center of the camera frame is at a position 47 in FIG. 12A when only x-coordinates are considered. If the y direction is not taken into consideration, a distance measurement result obtained by projecting distance measurement light on this point can be regarded as a distance measurement result in the center of the frame.

Letting $S_{2x}$ (see FIG. 4A) be the distance between the principal points of the finder objective lens 27A and the light-receiving lens 4 in the x direction, and $f_j$ be the distance between each light-receiving lens and a corresponding PSD, the following relationship is established between an incident position $x_2$ of a signal light beam on a PSD 7' and a distance L:

$$x_2 = \{(S+S_{2x}) \cdot f_j\}/L \quad (11)$$

A signal position $x_1$ on a PSD 5' may be used. In general, however, since a better result can be obtained with an increase in base length, the position $x_2$ is used.

FIG. 12C shows the center of the camera when only a y-coordinate is taken into consideration. Referring to FIG. 12C, reference numeral 13 denotes a light-emitting lens, 11, an IRED, and 27A, a finder objective lens. In this case, a reflected signal light beam incident from an object in the center of the frame forms a light spot at a position $Y_1$ on the PSD 7' via the light-receiving lens 4. At this time, the following relationship is established between the distance L and the incident position $Y_1$ of the signal light beam on the PSD 7':

$$Y_1 = (S_{2y} \cdot f_j)/L \quad (12)$$

where $S_2$ is the y-direction component of the distance between the principal points of the lenses 27A and 4.

If $S+S_{2x}=30$ mm, $f_j=20$ mm, and $S_{2y}=30$ mm, equations (11) and (12) can be rewritten into $$x_2 \cdot L = y_1 \cdot L = 600 \text{ mm}^2 \quad (13)$$

Figure 13:
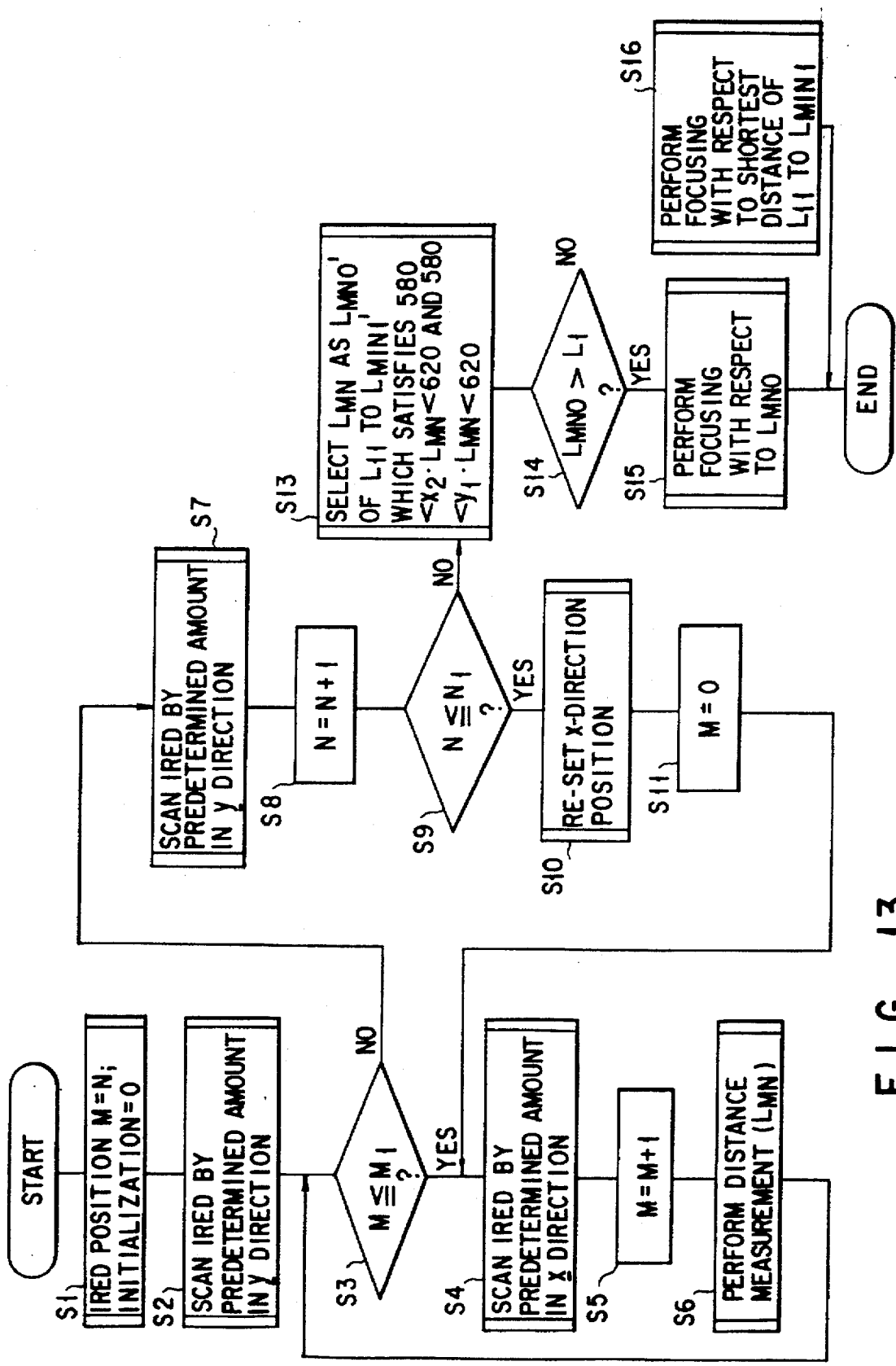
FIG. 13 is a flow chart for explaining the operation of the third embodiment in which priority is given to a distance measurement result $L_{MNO}$ at a central portion of the frame.

FIG. 13 is a flow chart for explaining the operation of the third embodiment in which great importance is attached to a distance measurement result $L_{MNO}$ in the center of the frame. Since steps S1 to S11 in the flow chart shown in FIG. 13 are the same steps S1 to S11 in FIG. 7, a description thereof will be omitted.

If it is determined in step S9 that a number N of points having undergone scanning distance measurement exceeds a value $N_1$, the flow advances to step S13 to determine a distance measurement result in the center of the frame from a distance $L_{MN}$, a light incident position $x_2$, and a predetermined distance $L_1$ in accordance with the principle described with reference to equations (11) and (12). In this case, a value for determination is based on equation (13). Note that an inequality is used in step S13 because there are variations in optical position detecting circuits and an error in IRED scanning position.

In step S14, the distance measurement result $L_{MNO}$ in the center of the frame, obtained in this manner, is compared with the predetermined distance $L_1$. If the object distance is smaller than $L_1=5$ m, the object located in the center of the frame can be considered as a main object, and the flow branches to step S15 to perform focusing on the basis of the distance measurement result $L_{MNO}$ in the center of the frame. In contrast to this, if the object distance is larger than $L_1=5$ m, it is considered that no main object is present in the center of the frame, and the flow branches to step S16. In step S16, a result exhibiting the nearest distance is selected from $M_1 \times N_1$ distance measurement results, and focusing is performed on the basis of the selected result as in step S12 in FIG. 7.

Figure 14:
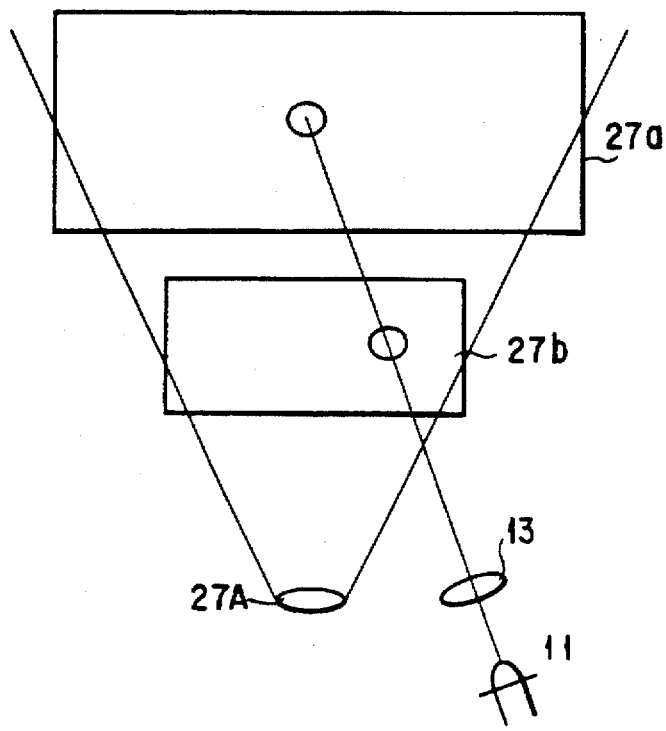
FIG. 14 is a view showing the position relationship between a finder lens and a light-emitting means in a general camera.

According to this embodiment, even in a scene like the one shown in FIG. 11, the camera can be properly focused on a human figure as a main object. As shown FIG. 14, the position relationship between the finder objective lens 27A and a light-emitting means (the IRED 11 and the light-emitting lens 13) in a conventional camera is fixed. For this reason, although distance measurement of a central portion of a frame 27a can be performed, a central portion of a frame 27b cannot be performed. Such a phenomenon is called a parallax between a distance measuring system and a finder system. In the third embodiment described above, the problem of such a parallax can be solved.

Figures 15A, 15B:
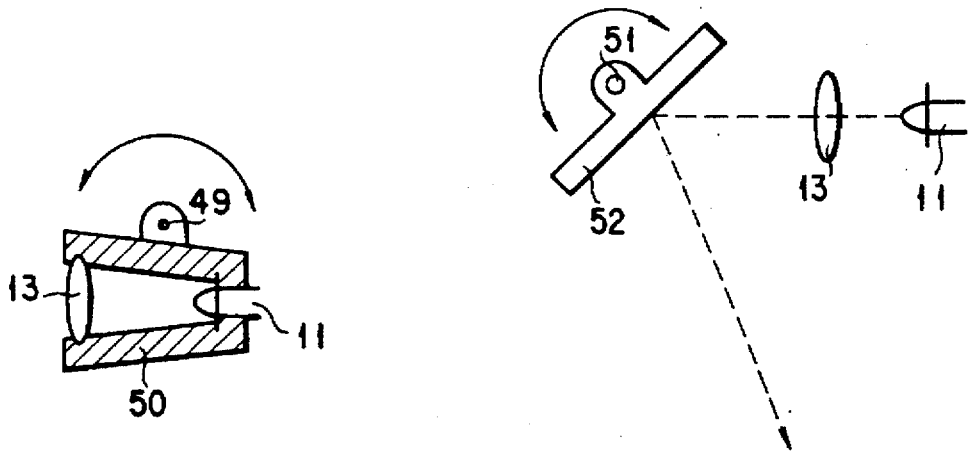
FIGS. 15A and 15B are views showing other arrangements for distance measurement scanning.

In the above description, a distance measurement light scanning operation is based on the IRED scanning mechanism shown in FIG. 3. However, the present invention is not limited to this. For example, the mechanisms shown in FIGS. 15A and 15B can substitute for the above mechanism. More specifically, FIG. 15A shows the arrangement of a unit 50 incorporating the light-emitting lens 13 and the IRED 11, which unit can be pivoted on a fulcrum 49. FIG. 15B shows a mechanism for reflecting distance measurement light emitted from the IRED 11 via the light-emitting lens 13 by using a mirror 52 which can be pivoted on a fulcrum 51.

In the above embodiment, a PSD is used as an optical position sensing device. However, the present invention is not limited to this. For example, a two-piece silicon photo-detector (SPD) may be used.

The fourth embodiment of the present invention will be described next with reference to FIGS. 16 to 23.

Figure 16:
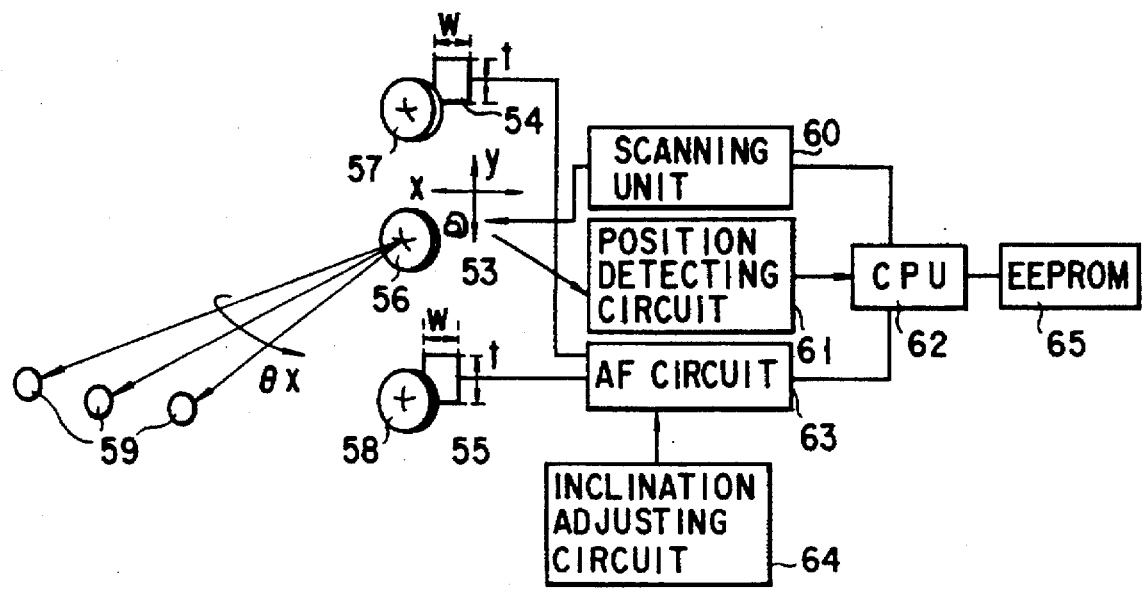
FIG. 16 is a block diagram showing the concept of a distance measuring device according to the fourth embodiment of the present invention.

Referring to FIG. 16 showing the fourth embodiment, an IRED 53 is arranged halfway between PSDs 54 and 55, each having a length t and a width M, in the vertical direction, i.e., the y direction in FIG. 16. A light-emitting lens 56 and light-receiving lenses 57 and 58 are respectively arranged in front of the IRED 53 and the PSDs 54 and 55 in the vertical direction. The emission direction of a distance measurement light beam 59 emitted from the IRED 53 via the light-emitting lens 56 can be changed (θx) by a scanning unit 60. In addition, a scanning position is input to a position detecting circuit 61 by a CPU 62.

Reflected signal light beams received via the light-receiving lenses 57 and 58 are received by the PSDs 54 and 55, and the light reception positions are detected by an AF circuit 63. The AF circuit 63 can obtain a value for correcting a distance measurement result from an inclination adjusting circuit 64.

Note that an EEPROM 65 as an electrically programmable memory for storing adjustment values for the device is connected to the CPU 62.

Figure 17:
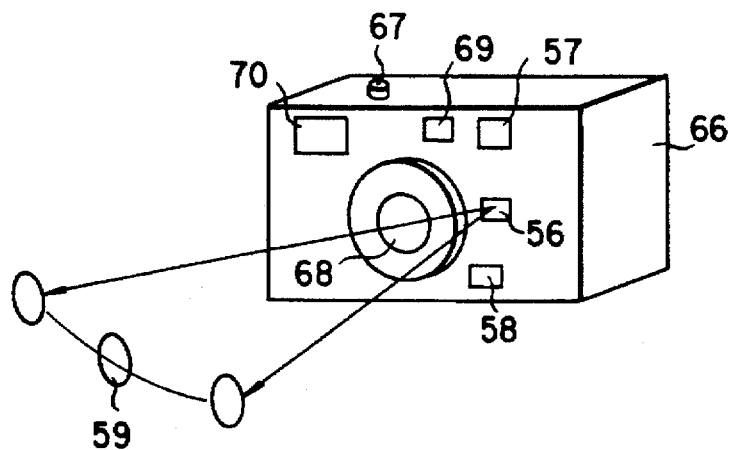
FIG. 17 is a perspective view showing the outer appearance of a camera incorporating the distance measuring device having the arrangement shown in FIG. 16.

FIG. 17 shows the outer appearance of a camera incorporating the distance measuring device having the above arrangement. Referring to FIG. 17, a release switch 67 is arranged on the upper surface of a camera body 66. A photographing lens 68 is arranged in substantially the center of the front surface of the camera, and a finder objective lens 69 is arranged above the photographing lens 68. The light-receiving lens 57 is arranged around the photographing lens 68 to be adjacent to the finder objective lens 69, and the light-emitting lens 56 and the light-receiving lens 58 are arranged below the light-receiving lens 57, as shown in FIG. 17. Note that reference numeral 70 denotes a flash unit.

The operations of the two PSDs of the distance measuring device having the above arrangement will be described next with reference to FIGS. 18A, 18B, and 18C.

The PSD 54 can measure the position of a signal light beam incident from a range $\theta_{57}$ via the light-receiving lens 57. The PSD 55 can measure the position of a signal light beam incident from a range $\theta_{58}$ via the light-receiving lens 58. Therefore, the position of a light spot which the two PSDs can simultaneously measure falls within a range $\theta_y$ indicated by a hatched portion E in FIG. 18A. Letting a be the distance from an end portion of each PSD to the optical axis of a corresponding light-receiving lens, and $f_j$ be the focal length, the range $\theta_y$ is given by equation (14):

$$\theta_y = 2 \times \arctan\frac{a}{f_j} \qquad (14)$$

In this case, if $f_j$=16 mm and a=0.3 mm, $\theta_y$ is only about 2°.

Considering the width w of each of the PSDs 54 and 55, as shown in FIG. 16, a range $\theta_x$ in which a light spot in the x direction in FIG. 16 can be detected is given by $$\theta_x = \arctan(w/f_j) \qquad (15)$$

If w=3 mm and $f_j$=16 mm, $\theta_x$ is 10.6°. The range $\theta_y$ may be expanded by increasing the value a. If, however, the value a is increased, the length t of each PSD increases, resulting in a deterioration in the resolving power of AF.

As is apparent from the above description, when distance measurement of many points within the photographic frame is to be performed by this distance measuring device, distance measurement can be performed in a wider area in the x direction than in the y direction.

Figure 18A:
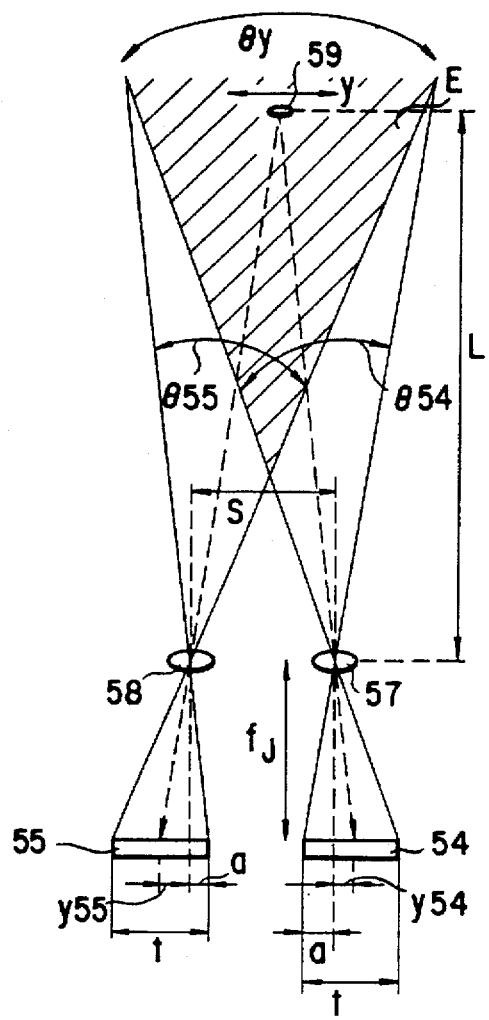
FIGS. 18A, 18B, and 18C are views for explaining the operations of two PSDs in the distance measuring device of the fourth embodiment.
Figure 18B:
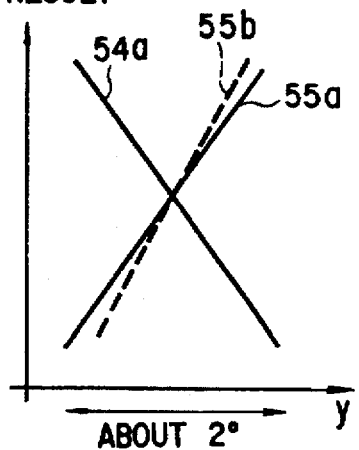

FIG. 18B shows the y-direction positions of light spots which are respectively incident on the PSDs 54 and 55 when the distance measurement light beam 59 is moved in the y direction at the same distance. As shown in FIG. 18A, light spot positions 54a and 55a on the PSDs 54 and 55, represented by outputs from the PSDs 54 and 55, cross each other at a position where light beams are symmetrically incident on the two PSDs. If the light-receiving lenses 57 and 58 and the PSDs 54 and 55 are arranged with proper symmetry, and circuits for processing outputs from the two PSDs have exactly the same characteristics, a correct distance measurement result can be obtained by adding the data representing the light spot positions 54a and 55a.

Note that if the arrangement of circuits or elements becomes unbalanced, the inclination of an output from each PSD becomes unbalanced, as indicated by a straight line 55b. In this case, a correct distance measurement result cannot be obtained by the above adding operation. The inclination adjusting circuit 64 described above serves to electrically correct such a distance measurement result.

Figure 18C:
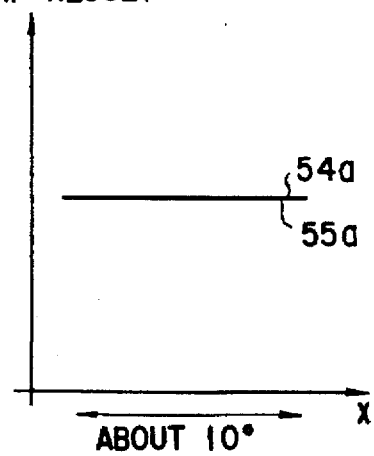

FIG. 18C shows the y-direction positions of light spots which are incident on the PSDs 54 and 55 when the distance measurement light beam 59 is moved in the x direction at the same distance. Since no change occurs in the y direction, constant outputs are ideally obtained, as shown in FIG. 18C.

The distance measuring device having the arrangement shown in FIG. 16 can perform distance measurement based on outputs from the two PSDs with respect to a distance measurement light beam incident from a range defined by 10° in the direction and 2° in the y direction under the condition of the above constants.

With this distance measurement scheme, correct focusing can be performed with respect to a distance measurement light beam reflected by a portion of a 2°×10° range E' within the frame like the one shown in FIG. 19. Even if a distance measurement light beam expands outside an object, as shown in FIG. 19, distance measurement can be properly performed as long as reflected light beams return.

Especially when a remote object is to be photographed, an emitted beam spot diameter $\phi_T$ increases in proportion to a distance L according to equation (16). For this reason, the diameter $\phi_T$ tends be larger than a face size $\phi_F$.

$$\phi_T = (\phi_{LED}/f_T) \cdot L \qquad (16)$$

where $f_T$ is the focal length of the light-emitting lens, and $\phi_{LED}$ is the diameter of light emitted from the IRED.

In a general active trigonometric distance measurement scheme, proper distance measurement can be performed only under the condition of $\phi_F > \phi_T$. According to this embodiment, however, as described above, proper distance measurement can be performed as long as some light beams of distance measurement light are reflected by an object and incident on the two PSDs.

The fourth embodiment will be described in more detail below with reference to FIG. 20.

The light-emitting operation of the IRED 53 is controlled by the CPU 62 via an IRED driver 71. The IRED 53 is mounted on a movable member 72. The IRED 53 can be moved in the x direction in FIG. 20 by a motor 73 and a feed screw 74, and in the y direction by a motor 75 and a feed screw 76. The CPU 62 controls the rotation of the motors 73 and 75 via motor (M) drivers 77 and 78, thereby controlling the relative positions of the IRED 53 and the light-emitting lens 56.

An initial position switch 79 serves to detect the initial position of the IRED 53. The CPU 62 detects the position of the IRED 53 depending on an angle of rotation from the initial position. Since the direction of a light beam passing through the light-emitting lens 56 changes with a change in the position of the IRED 53, a distance measurement light emission point 59 can be changed, as shown in FIG. 16. The CPU 62 measures each point in the frame by controlling the IRED driver 71 while changing the position of the IRED 53 in this manner.

Distance measurement light beams emitted in this manner are reflected by an object (not shown) and focused on the PSDs 54 and 55 via the two light-receiving lenses 57 and 58. When these distance measurement light beams are incident on the PSDs 54 and 55, two current signals corresponding to the incident positions of the light beams are output by the functions of the PSDs. These current signals are received by preamplifiers 80, 81, 82, and 83 with low input impedances and amplified. The amplified signals are then input to compression diodes 84, 85, 86, and 87, respectively.

Compressed voltages generated by the compression diodes 84, 85, 86, and 87 are respectively introduced to the bases of npn transistors 92, 93, 94, and 95 by buffer circuits 88, 89, 90, and 91 with reference to a reference voltage $V_{ref}$. The npn transistors 92 and 93 and the npn transistors 94 and 95 respectively have common emitters and constitute differential circuits. Current sources 96 and 97, each capable of starting or stopping supply of a predetermined current value in synchronism with the emission of light from the IRED 53, are respectively connected to the emitters of the these npn transistors. The collectors of the npn transistors 93 and 94 are connected to Vcc. The collectors of the npn transistors 92 and 95 are connected to Vcc via an integral capacitor 98. The output voltage of the integral capacitor 98 is controlled by the CPU 62 and can be initialized by a switch 99.

Since the two output currents from the PSDs 54 and 55 are compressed and input to the differential circuit in this manner, the collector currents of the npn transistors 92 and 95 become outputs proportional to the incident positions of signal light beams on the respective PSDs. These collector currents are denoted by reference symbols $I_{92}$ and $I_{95}$.

If symbols in FIG. 18A are used, $$I_{92}=A_{92}\cdot(a+y_{54}),$$

$$I_{95}=A_{95}\cdot(a+y_{55}) \quad (17)$$

for $A_{92}$ and $A_{95}$: proportional constants If, therefore, $A_{92}=A_{95}$, a voltage $V_{98}$ generated by the integral capacitor 98 when the switch 99 is turned off and the IRED 53 is caused to emit light is given by $$V_{98}=A_{92}(2a+y_{54}+y_{55})\cdot B_{98} \quad (18)$$

for $B_{98}$: proportional constant

That is, since the relationship represented by mathematical expression (19) is established, $y_{54}+y_{55}$ is obtained from the voltage $V_{98}$ when the CPU 62 inputs the voltage $V_{98}$ to the built-in A/D converter.

$$V_{98} \propto Y_{54}+Y_{55} \quad (19)$$

Therefore, an object distance L can be given by $$L=S\cdot f/(y_{54}+y_{55}) \quad (20)$$

In performing distance measurement of scenery or the like, no reflected signal light beam from the object is sometimes incident on the PSDs. In this case, if the amount of signal light is small, the output voltage from each compression diode decreases, resulting in distance measurement calculation based on noise. As is apparent, this calculation result is irrelevant to a correct object distance. For this reason, output voltages from the compression diodes 85 and 87 are determined by comparators 100 and 101. When these output voltages are lower than a predetermined level, the comparators 100 and 101 output determination signals to the CPU 62. Upon detection of these signals, the CPU 62 ignores an output voltage from the integral capacitor 98 and determines that the object distance is, for example, infinity.

Note that reference numeral 102 denotes an adjusting circuit for adjusting the inclinations of AF results described as the light spot position 55a and the straight line 55b in FIG. 18B.

FIGS. 21A, 21B, and 21C are views for explaining the adjusting circuit 102. For example, as shown in FIG. 21C, owing to some problem in the manufacture of the device, the positional relationships between the light-receiving lenses 57 and 58 and the PSDs 54 and 55 may not properly coincide with each other. That is, it is difficult to make distances $f_{f54}$ and $f_{f55}$ perfectly coincide with each other, and it is also difficult to make inclinations $\theta_{54}$ and $\theta_{55}$ perfectly coincide with each other owing to some problem in mounting the PSDs.

Such an error in assembly directly leads to an inclination error in an AF result like the one shown in FIG. 18B. If inclination adjustment is to be performed by mechanically adjusting such an error, a special adjusting mechanism must be prepared, resulting in a higher cost and a longer adjustment time. For this reason, the adjusting circuit 102 and the nonvolatile memory (EEPROM) 65 are used to electrically adjust such an inclination.

More specifically, the adjusting circuit 102 has an arrangement like the one shown in FIG. 21A. This circuit is designed to switch current values from the current source 96.

By changing the current value of the current source 96, a collector current $I_{92}$ of the npn transistor 92 and a proportional constant $A_{92}$ of a position $y_{54}$ of a light beam incident on the PSD 54 can be changed. Even if, therefore, the proportional constant $A_{92}$ does not coincide with a proportional constant $A_{95}$ of another light-receiving system, proper distance measurement can be performed by electrically adjusting the proportional constant $A_{92}$.

The current source 96 is constituted by an npn transistor, as shown in FIG. 21A. The current source 96 constitutes a current mirror circuit, together with an npn transistor 103. The collector and base of the npn transistor 103 are short-circuited. Five constant-current sources 104, 105, 106, 107, and 108 are connected to the collector of the npn transistor 103. Of the constant-current sources 104 to 108, the four constant-current sources 105 to 108 are ON/OFF-controlled by a counter circuit constituted by flip-flops 109, 110, 111, and 112.

The CPU 62 controls input of a CK (clock) signal and a Reset (reset) signal to the counter circuit to perform ON/OFF control of each current source. When a predetermined clock is input to the CK terminal of the counter circuit while the Reset signal is at L (low) level, a current value $I_{INT}$ in the collectors of the npn transistors 103 and 96 changes, as shown in FIG. 21B.

In assembling the device, the difference between the proportional constants $A_{92}$ and $A_{95}$ based an error in assembly of each PSD may be detected in advance, the current value $I_{INT}$ for canceling out the difference may be calculated, and a value corresponding to this clock count may be stored in the electrically erasable programmable ROM (EEPROM) 65 capable of electrically writing data.

A transistor 113 in FIG. 21A is a switch for ON/OFF-controlling the current source 96 in synchronism with the emission of light from the IRED.

Assume that inclinations like inclinations $\theta_{54}$ and $\theta_{55}$ in FIG. 21C are present in the PSDs. In this case, when the IRED is scanned in the $\underline{x}$ direction, an AF result changes even if the object distance remains the same. For this reason, a constant AF result which does not change with respect to the scanning position $\underline{x}$, like the one shown in FIG. 18C, cannot be obtained.

For this reason, the EEPROM 65 is used to store correction coefficients, each for correcting an error in the scanning position x of the IRED. The CPU 62 can detect the scanning position x on the basis of the initial position switch 79 and the rotational speed of the motor 73 (see FIG. 20). A distance measurement result obtained when distance measurement of the position x is performed is input to the EEPROM 65. After the distance measurement result is corrected by a correction value corresponding to the position x, the resultant value is determined as a correct distance measurement result. With this operation, the mounting process of each PSD can be simplified, and the cost can be reduced.

A method of performing distance measurement of a portion outside the range E in which the position of a light spot can be simultaneously detected by the two PSDs 54 and 55 will be described next with reference to FIG. 22.

When the IRED 53 emits light from a position which is shifted from the optical axis of the light-emitting lens 56 by $y_{LED}$, distance measurement of a portion 59 at the object distance L cannot be satisfactorily performed by the above method. This is because no reflected signal light beam from the portion 59 is incident on the PSD 55, even though a reflected signal light beam is incident on the PSD 54, and the signal light beam incident position $y_{55}$ cannot be detected.

However, since the reflected light beam is incident at the position $y_{54}$ on the other PSD 54, distance measurement can be performed on the basis of this information. Letting $S_1$ be the distance between the principal points of the light-emitting lenses 56 and 57, and $f_r$ be the focal length of the light-receiving lens 57, $$L = S_1 f_r / (y_{LED} + y_{54}) \quad (21)$$

Figure 23:
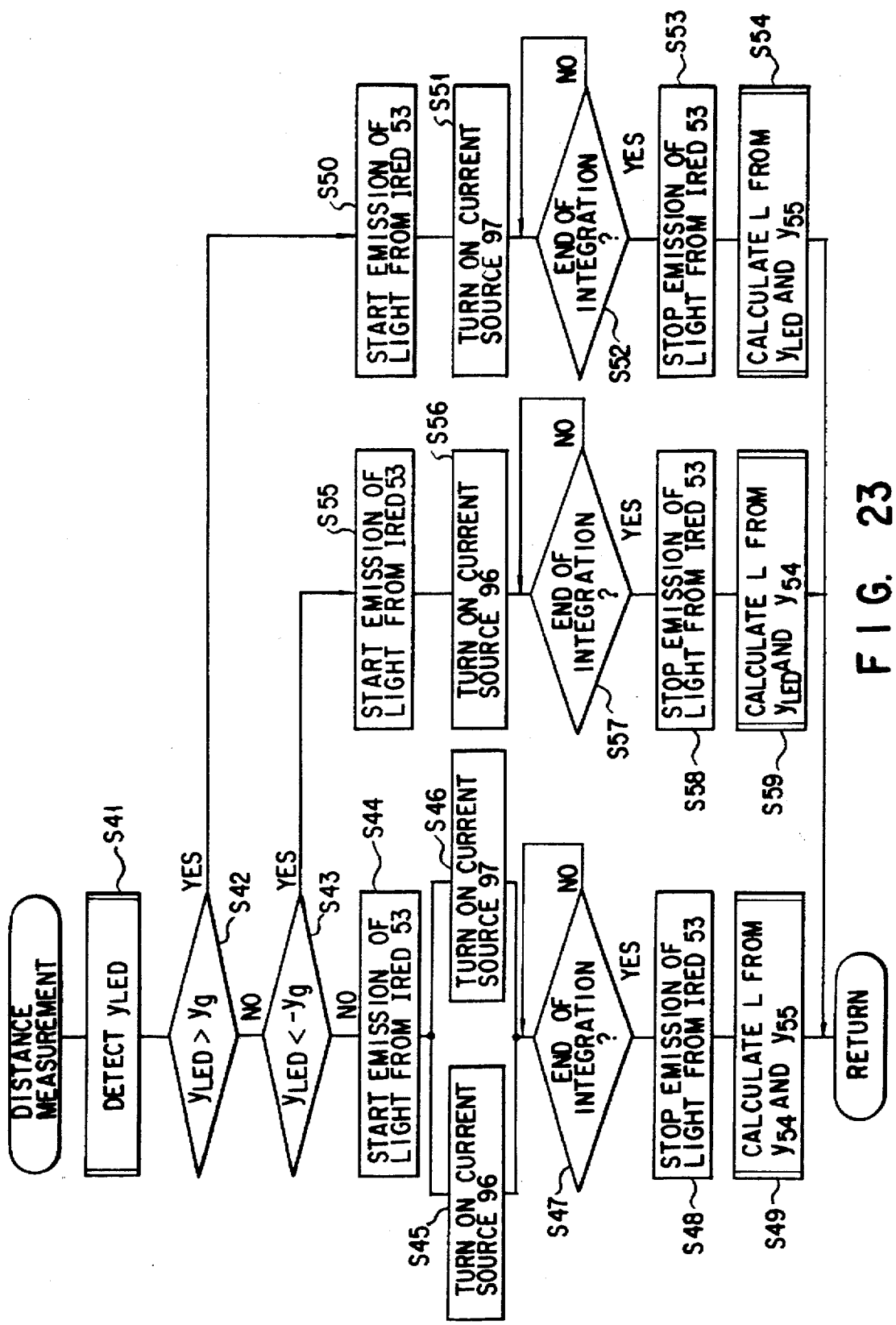
FIG. 23 is a flow chart for explaining the operation of the distance measuring device in FIG. 20.

FIG. 23 is a flow chart for explaining the operation of the distance measuring device capable of performing distance measurement in the above case. The operation of this device will be described below with reference to this flow chart.

In step S41, the CPU 62 detects the position $y_{LED}$ of the IRED 53 on the basis of the initial position switch 79 and the rotational speed of the motor 73. In steps S42 and S43, the value of the position $y_{LED}$ is determined. The flow advances to step S44 and the subsequent steps, in which distance measurement processing is performed by using the PSDs 54 and 55, only when $y_{LED}$ satisfies $-y_g \leq y_{LED} \leq y_g$. Note that the above values $-y_g$ and $y_g$ represent the limits of the position $y_{LED}$ within which the distance measurement light beam 59 falls within the hatched region E in FIG. 18A.

In step S44, the CPU 62 causes the IRED 53 to start emitting light. In steps S45 and S46, the CPU 62 turns on the current sources 96 and 97 to perform an integrating operation for detecting the incident positions $y_{54}$ and $y_{55}$ of the signal light beams on the two PSDs 54 and 55. The resultant signals are integrated in the integral capacitor 98. In step S47, it is checked whether integration to be performed for a predetermined period of time is completed. If YES in step S47, the emission of light from the IRED 53 is completed in step S48. Thereafter, in step S49, the object distance L is calculated from the voltage charged in the integral capacitor 98 on the basis of a distance S between the two light-receiving lenses and the positions $y_{54}$ and $y_{55}$.

If it is determined in step S42 that the value of $y_{LED}$ increases, and no signal is input to the PSD 54, the flow branches to step S50. After the IRED 53 is caused to emit light in step S50, the current source 97 is turned on to perform an integrating operation for detecting the incident position $y_{55}$ of the signal light beam on the PSD 55 in step S51. If the end of the integrating operation is detected after the lapse of a predetermined period of time in step S52, completion of the emission of light from the IRED 53 is controlled in step S53. Thereafter, the position $y_{55}$ is detected from the integration result obtained in step S54, and the object distance L is calculated on the basis of the position $y_{LED}$ and the distance between the light-emitting lens 56 and the light-receiving lens 58.

Figure 22:
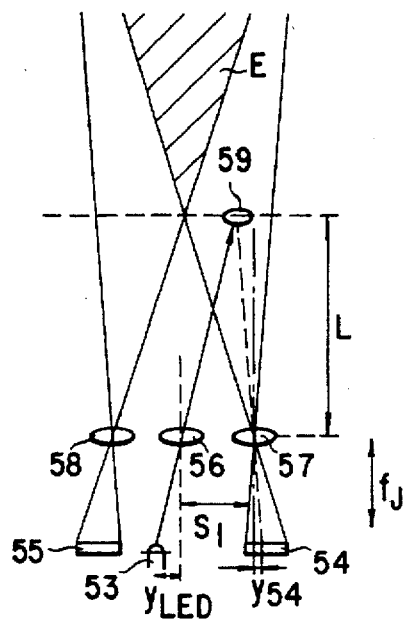
FIG. 22 is a view for explaining a method of performing distance measurement of a portion outside a range E, which cannot be simultaneously detected by the two PSDs 54 and 55.

If it is determined in step S43 that the value of $Y_{LED}$ exceeds the value $-y_g$, it indicates that a state like the one shown in FIG. 22 has occurred. Therefore, the IRED 53 is caused to emit light in step S55, and the current source 97 is turned on in step S56. If the end of the integrating operation is detected after the lapse of a predetermined period of time in step S57, completion of the emission of light from the IRED 53 is controlled in step S58. Thereafter, in step S59, the object distance L is calculated from $y_{54}$, $Y_{LED}$, and $S_1$ (see FIG. 22) in the same manner as in step S54 described above.

By also using a distance measurement calculation scheme based on the scanning position $Y_{LED}$ of the IRED and the distance between the light-emitting and light-receiving portions, a device capable of performing distance measurement at a wider field angle can be provided.

As described above, according to the first to fourth embodiments of the present invention, there is provided a camera having a light projection type distance measuring device for auto-focusing which can perform high-precision distance measurement of a plurality of points within the frame at a high speed.

Figure 24:
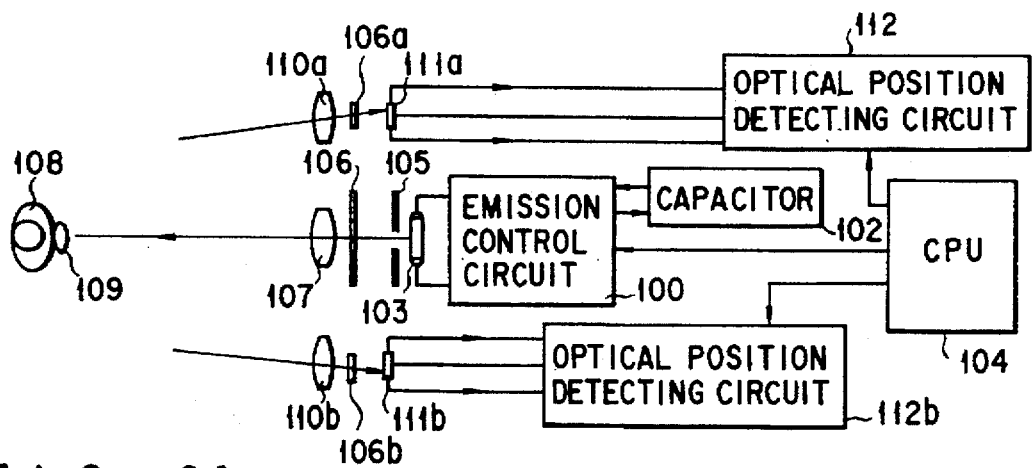
FIG. 24 is a block diagram showing the concept of a distance measuring device according to the fifth embodiment of the present invention.

FIG. 24 is a block diagram showing the concept of a distance measuring device according to the fifth embodiment of the present invention.

Referring to FIG. 24, a charging capacitor 102 and a xenon tube (Xe tube) 103 are connected to an emission control circuit 101. The emission control circuit 101 charges the charging capacitor 102 for causing the xenon tube 103 to emit light and controls the emission of light, together with a CPU 104 connected to the emission control circuit 101.

A mask 105 having a small window, a visible light cut filter 106, and a light-emitting lens 107 are arranged in front of the Xe tube 103. Since light emitted from the Xe tube 103 forms a large projection pattern without a mask, the mask 105 is arranged in front of the Xe tube 103 to minimize the area of a light-emitting pattern 109 of distance measurement light projected from the light-emitting lens 107 onto an object 108 to be measured. Note that the visible light cut filter 106 is arranged to prevent a dazzling effect on the object 108 if the object is a human figure.

The light-receiving side is arranged such that light beams reflected by the object 108 are incident on light-receiving elements 111a and 111b via light-receiving lenses 110a and 110b and visible light cut filters 106a and 106b. As each of the light-receiving elements 111a and 111b, a semiconductor optical position sensing device (PSD) for outputting a signal dependent on the position of a reflected signal light beam from the object 108 is assumed to be used. Outputs from the light-receiving elements 111a and 111b are respectively input to optical position detecting circuits 112a and 112b.

In the binocular light-receiving distance measuring device having such two light-receiving lenses, the charging capacitor 102 is charged by the CPU 104 and the emission control circuit 101. As a result, the Xe tube 103 is caused to emit light. The area of a light beam emitted from the Xe tube 103 is decreased by the window of the mask 105, and the visible light of the light beam is cut by the visible light cut filter 106. The resultant light beam is projected on the object 108 via the light-emitting lens 107.

Light beams reflected by the object 108 are incident on the light-receiving elements 111a and 111b via the light-receiving lenses 110a and 110b and the visible light cut filters 106a and 106b. Outputs from the light-receiving elements 111a and 111b are input to the optical position detecting circuits 112a and 112b. The distance to the object 108 is then calculated by the CPU 104 on the basis of outputs from the optical position detecting circuits 112a and 112b.

Figure 25:
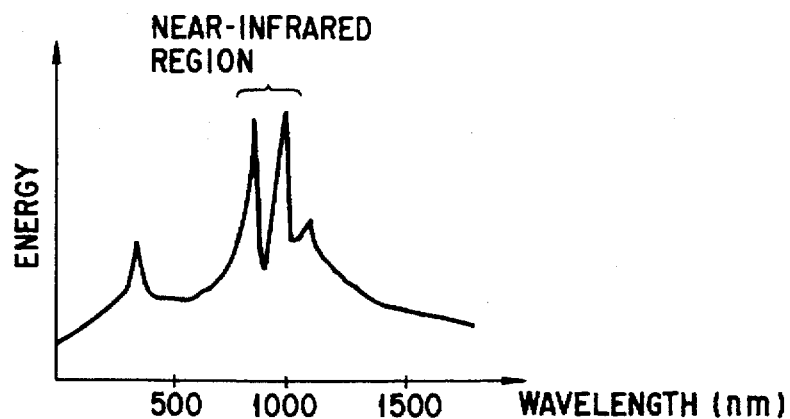
FIG. 25 is a graph showing the wavelength distribution of light in a xenon tube (Xe tube)

FIG. 25 is a graph showing the wavelength distribution of light emitted from the Xe tube 103. In this embodiment, as projected light, energy near a peak in a near-infrared region is used. Therefore, the visible light cut filters 106a and 106b are also arranged in front of the optical position detecting circuits 112a and 112b. For this reason, distance measurement with a high S/N ratio can be realized by optically removing noise components such as illumination light and sunbeams radiated on the object 108.

An infrared beam is not easily influenced by a difference in reflectance due to a difference in color between objects, and hence is suitable for such a light projection type distance measuring device.

The merits of AF based on such a binocular light-receiving scheme will be described next with reference to FIG. 26.

A distance measurement beam spot 109 is projected on the object 108. If this beam spot 109 is reflected without any omission, as shown in FIG. 26, barycentric positions $x_A$ and $x_B$ of reflected light beams are determined with respect to the PSDs 111a and 111b, as indicated by the solid lines in FIG. 26.

A distance L can be obtained from the barycentric positions $x_A$ and $x_B$, a base length S, and a focal length $f_j$ of each light-receiving lens according to the following equation:

$$L = S \cdot f_j / (x_A + x_B) \tag{22}$$

If, however, part of the beam spot 109 is not properly radiated on the object 108 (radiated only on the hatched portion in FIG. 26), as shown in FIG. 26, the barycentric positions of the signal light beams on the PSDs 111a and 111b are shifted from the correct barycentric positions $x_A$ and $x_B$ by $\Delta x_A$ and $\Delta x_B$, respectively. Such shifts increase with an increase in the size of the beam spot 109.

In a general distance measuring device having only one light-receiving lens, a distance measurement result varies depending on $\Delta x_A$ ($\Delta x_B$). This is the reason why a Xe tube having a large beam spot area is difficult to use as a distance measurement light source for a general camera.

In addition, as described above, the electric discharge path of the Xe tube tends to vary for each light-emitting operation. That is, in addition to the problem of a beam spot area, the problem of spot omission due to variations in the discharge path is posed.

According to the binocular light-receiving scheme as in the present invention, since the errors $\Delta x_A$ and $\Delta x_B$ in the incident positions of the light beams on the PSDs cancel each other, $$x_A + x_B = x_A - \Delta x_A + x_B + \Delta x_B$$

Therefore, distance measurement errors caused by variations in the emission point of a light beam emitted from the Xe tube and spot omission can be perfectly prevented.

Furthermore, variations in the amount of light emitted from the Xe tube basically have no influence on distance measurement precision in this scheme based not on the principle of light amount measurement but on the principle of trigonometric distance measurement.

In the above embodiment, although the visible light cut filters 106a and 106b are respectively arranged in front of the optical position detecting circuits 112a and 112b as well as the visible light cut filter 106 in front of the Xe tube 103, the visible light cut filters 106a and 106b on the light-receiving side need not be arranged.

The sixth embodiment of the present invention will be described next.

FIG. 27 shows a distance measuring according to the second embodiment of the present invention. Unlike the device shown in FIG. 24, this device is designed to perform distance measurement of a plurality of points. The same reference numerals in the sixth embodiment denote the same parts as in the fifth embodiment described above, and a description thereof will be omitted.

An emission control circuit 101 including a capacitor is designed to cause a Xe tube 103 to emit light a plurality of number of times. A mask 105 arranged in front of the front surface of the Xe tube 103 is moved in the direction indicated by an arrow $D_1$ in FIG. 27 by the rotating/driving operation of a motor 114 via a feed screw 113 every time the Xe tube 103 is caused to emit light. The motor 114 is controlled by a CPU 104 via a motor driver 115. A distance measurement start switch 116 is connected to the CPU 104.

The mask 105 having a window is moved in the direction indicated by the arrow $D_1$ by causing the motor driver 115 and the motor 114 to rotate the feed screw 113. With this operation, distance measurement of a plurality of points within the frame can be performed, as shown in FIG. 28. That is, distance measurement of a plurality of points in the frame can be performed by sequentially radiating a beam spot 109 on a plurality of regions 109a.

Figure 29:
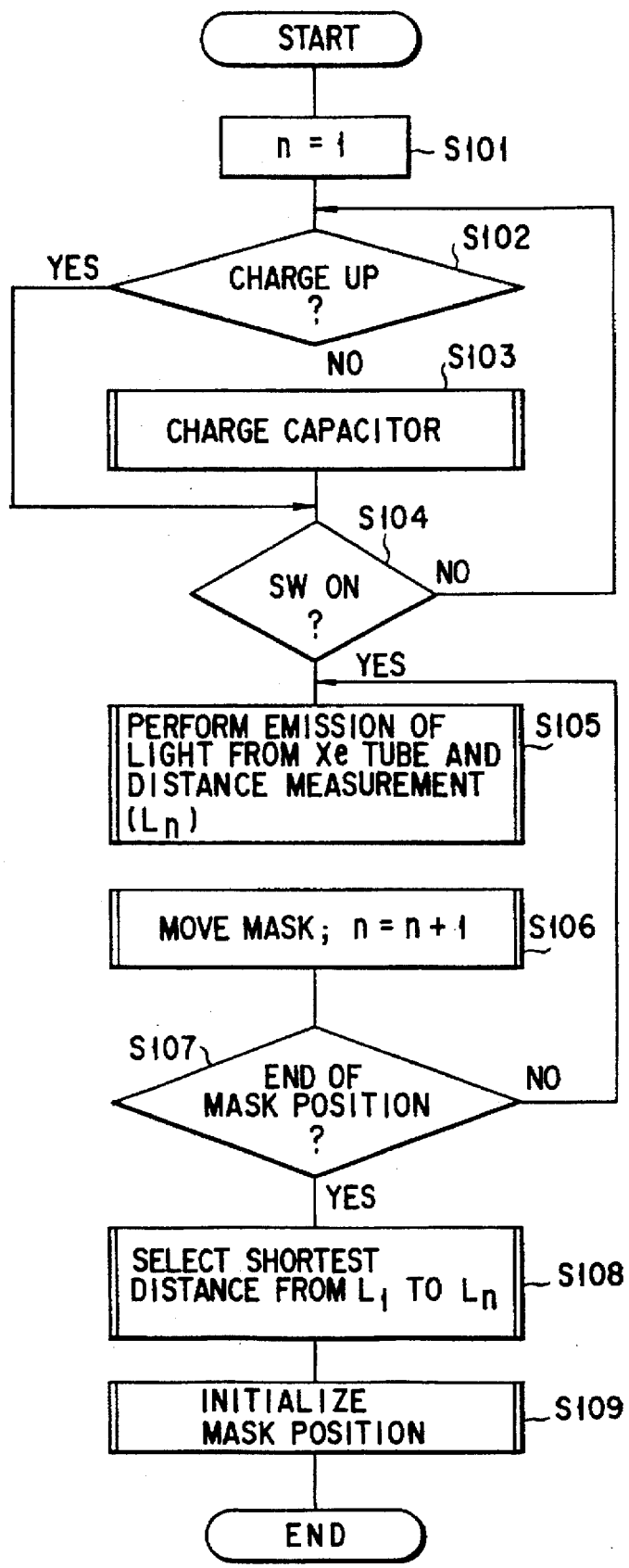
FIG. 29 is a flow chart for explaining the operation of the distance measuring device having the arrangement shown in FIG. 27.

The operation of the distance measuring device having such an arrangement will be described below with reference to the flow chart shown in FIG. 29.

First of all, in step S101, a variable n representing a distance measurement point is initialized. In step S102, it is checked whether energy for causing the Xe tube 103 to emit light is charged in the light-emitting capacitor in the emission control circuit 101. If NO in step S102, the flow advances to step S103 to charge the capacitor.

If YES in step S102, the flow advances to step S104 to check whether the distance measurement start switch 116 is ON. If NO in step S104, the flow returns to step S102. If YES in step S104, the flow advances to step S105. In step S105, the Xe tube 103 is caused to emit light; reflected signal light beams are respectively received by PSDs 111a and 111b via light-receiving lenses 110a and 110b; and incident positions $x_a$ and $x_b$ of the light beams are detected by optical position detecting circuits 112a and 112b.

As shown in FIG. 26, the PSDs 111a and 111b output two current outputs. Consider the PSD 111a in this case. Two outputs $I_{1a}$ and $I_{2a}$ from the two PSDs are characterized by satisfying the following relation:

$$I_{1a}/(I_{1a}+I_{2a}) = A \cdot x_A/t + B \tag{23}$$

(where A and B are constants, and t is the length of the PSD) Therefore, when the optical position detecting circuit 112a calculates $I_{1a}/(I_{1a}+I_{2a})$, the incident position $x_A$ can be obtained.

In order to calculate two currents $I_1$ and $I_2$ according to $I_1/(I_1+I_2)$, the currents $I_1$ and $I_2$ are compressed by compression diodes 117 and 118, as shown in FIG. 30. These compressed currents are input to a differential expanding circuit 121 via buffers 119 and 120 to obtain a current $I_{OUT}$.

The differential expanding circuit 121 is constituted by npn transistors 122 and 123 having a common emitter, and a current source 124, connected to the common emitter, for supplying a constant current $I_0$. The current source 124 is turned on and off by a switch. By turning on the current source 124 simultaneously with a light-emitting operation, the output current $I_{OUT}$ can be obtained from the collector of the transistor 122 according to the following equation:

$$I_{OUT}=\{I_1/(I_1+I_2)\}\cdot I_0 \qquad (24)$$

If, therefore, the capacitor is connected to a terminal 125, the output current $I_{OUT}$ can be obtained after the lapse of a predetermined period of time. If the CPU 104 receives the voltage across the capacitor via a built-in A/D converter or the like, a voltage signal proportional to $A\cdot(x_A/t)+B$ in equation (23) can be read.

When the CPU 104 calculates the position $x_A$ from the constants A and B, and the position $x_B$ with a similar arrangement, the CPU 104 can obtain the distance L to the object according to equation (22).

In step S105, the distance obtained in this manner is set as a distance $L_n$.

In step S106, the mask 105 is scanned by a predetermined amount, and the variable n is incremented. The emission of light from the Xe tube 103 and distance measurement are repeated in step S105 until the mask 105 is moved to the end position in step S107. In this manner, as shown in FIG. 28, distance measurement of a plurality of points can be performed.

In step S108, the shortest distance is selected from distances $L_1$ to $L_n$. The camera having the above distance measuring device can be properly focused on a human figure even in a scene where a main object 108 to be photographed (an object to be measured) is not present at a central portion of the frame, as shown in FIG. 28.

Subsequently, in step S109, the projection position changing mask 105 is returned to the initial position, and the sequence is ended.

The seventh embodiment of the present invention will be described next.

Figure 31:
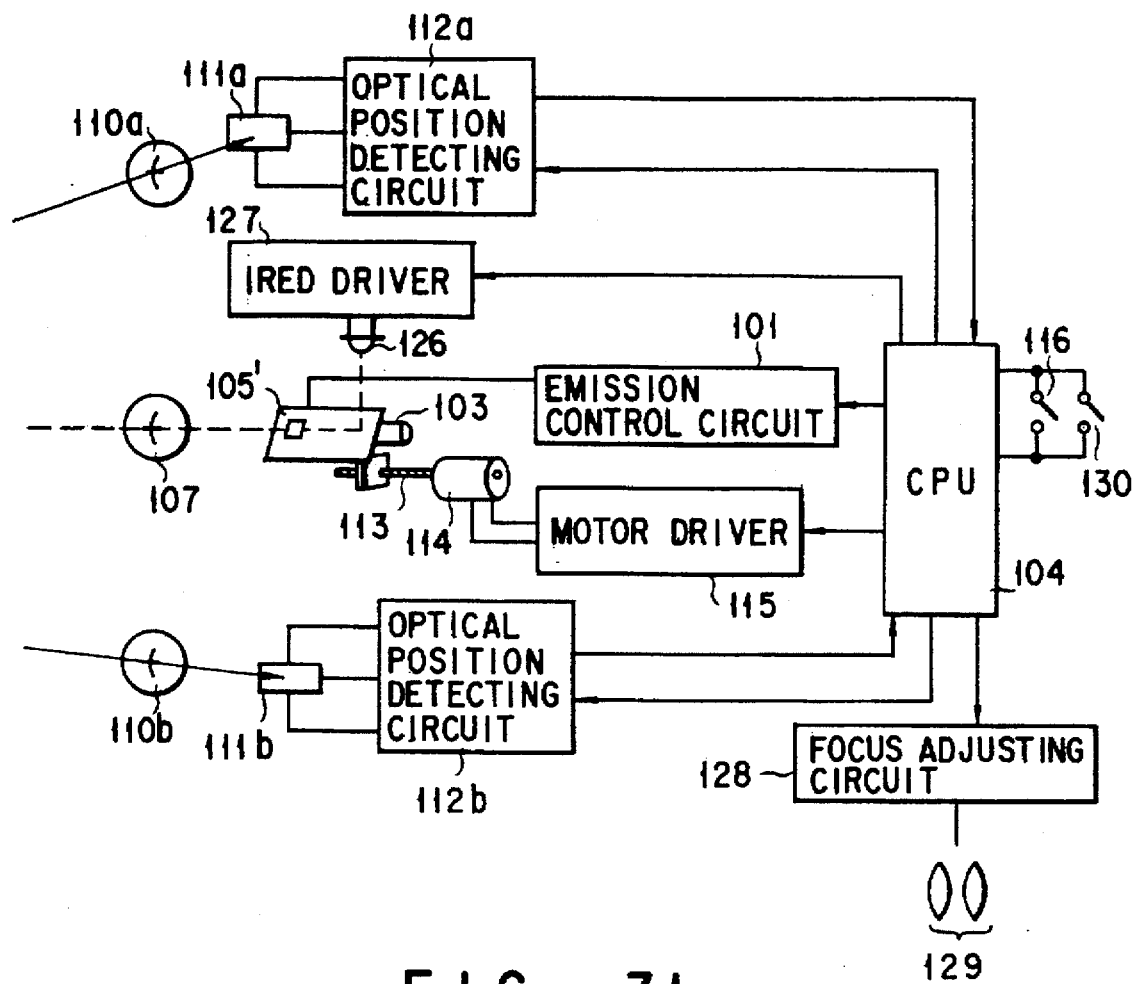
FIG. 31 is a block diagram showing the arrangement of a distance measuring device according to the seventh embodiment of the present invention.

FIG. 31 shows the arrangement of the seventh embodiment of the present invention. The basic arrangement of this embodiment is the same as that shown in FIG. 27 except for the following portions.

In this embodiment, a mask 105' whose surface is processed by mirror coating is used in place of the mask 105 in FIG. 27 so that light emitted from an IRED 126 can be radiated on an object via a light-emitting lens 107. The IRED 126 is controlled by a CPU 104 via an IRED driver 127. The IRED 126 in the seventh embodiment can radiate light on a central portion of the frame. Therefore, strong light need not be radiated from a Xe tube onto a human figure present immediately in front of the camera, as in the scene shown in FIG. 32.

A focus adjusting circuit 128 drives/controls a lens group 129 constituted by a focusing lens, a zoom lens, and the like. Second (2nd) and first (1st) release switches 130 and 116 of the release button of the camera are connected to the CPU 104. The 2nd release button is depressed by a photographer when he/she takes a photograph. The 1st release switch 116 is closed when the release button is depressed halfway.

Figure 33:
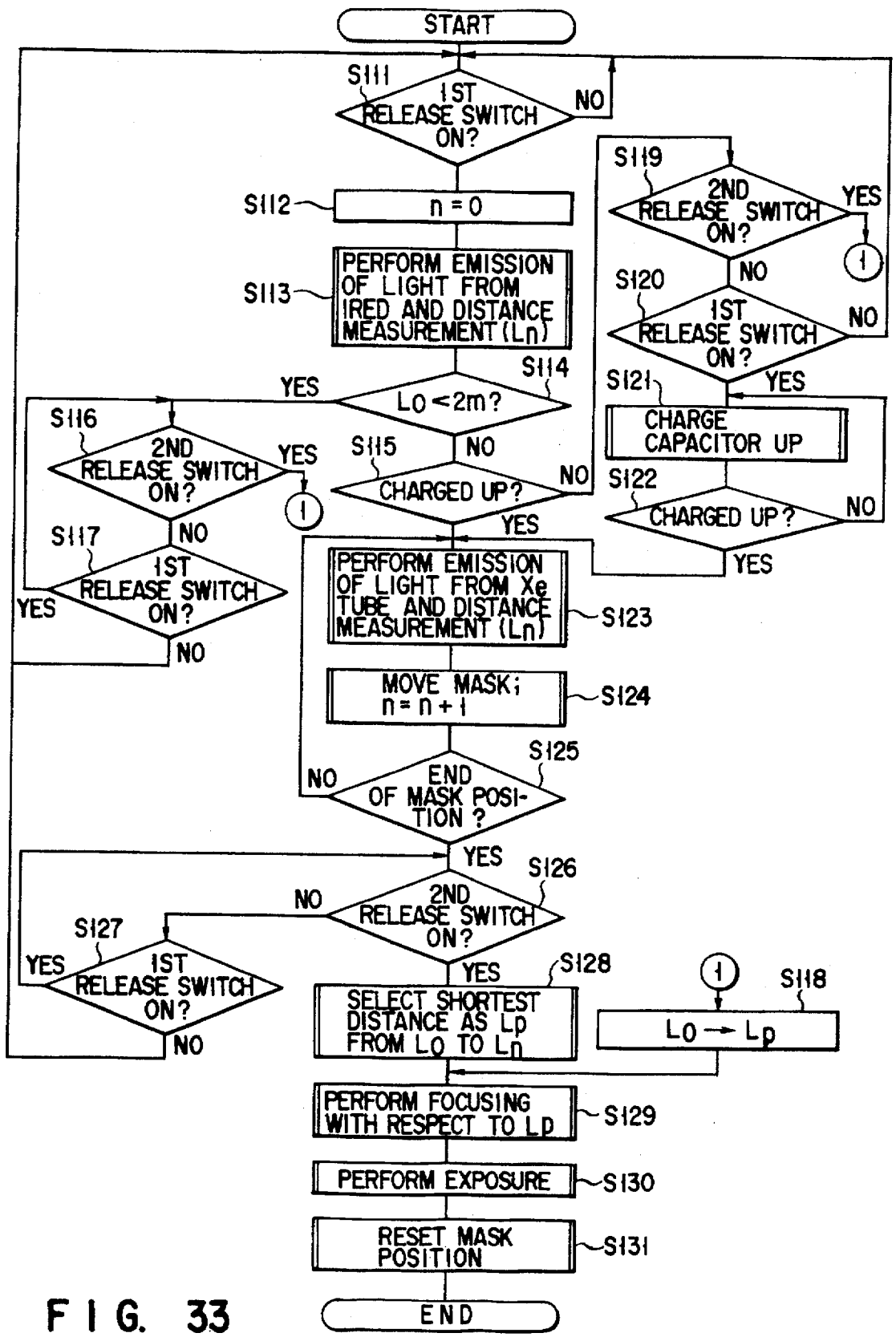
FIG. 33 is a flow chart for explaining the operation of the distance measuring device having the arrangement shown in FIG. 31.

The operation of the seventh embodiment will be described next with reference to the flow chart shown in FIG. 33.

In step S111, it is checked whether the 1st release switch 116 is ON and the photographer holds the camera to perform a photographing operation. In step S112, a variable representing a distance measurement point is reset before distance measurement. In step S113, the IRED 126 is caused to emit light, and optical position detecting circuits 112a and 112b output $I_{OUT1}$ and $I_{OUT2}$ on the basis of signals obtained from PSDs 111a and 111b. With this operation, the CPU 104 calculates an object distance L as a distance $L_0$ according to equations (22) to (24) and the following relationship:

$$L=S\cdot f/\{(I_{OUT1}+I_{OUT2})/(I_0\cdot B)\cdot t/A\} \qquad (25)$$

In step S114, it is checked whether $L_0$ is smaller than 2 m. If NO in step S114, the flow advances to step S115. If YES in step S114, the flow advances to step S116. If it is determined in step S116 that the 2nd release switch 130 is not ON, it is checked in step S117 whether the 1st release switch 116 is ON. If neither of the 1st and 2nd switched are ON, the flow returns to step S111.

In step S115, it is checked whether the charging capacitor (not shown) of an emission control circuit 101 for a Xe tube 103 is charged. If the capacitor is insufficiently charged, the flow branches to step S119. After the release switches are checked in steps S119 and S120, the capacitor is charged in step S121. This charging operation is continued until the end of the charging operation is determined in step S122.

If it is determined in step S116 or S119 that the 2nd release switch 130 is ON, priority is given to a release time lag, and a charging operation is not performed. The flow then advances to step S118. In step S118, the obtained distance $L_0$ is set as a focusing distance $L_p$. The flow then advances to step S129.

If it is determined in step S115 or S122 that the capacitor is charged up, the flow advances to step S123 to perform distance measurement while causing the Xe tube 103 to emit light. In this distance measurement, the CPU 104 calculates the distance L from the outputs $I_{OUT1}$ and $I_{OUT2}$ from the optical position detecting circuits 112a and 112b, based on the current signals from the light-receiving elements 111a and 111b, according to equation (25), as in the distance measurement using the IRED 126.

The loop from step S124 for a mask position scanning operation to step S125 for detecting the end mask position is designed for distance measurement of a plurality of points in the frame as in the eighth embodiment described above. If it is determined in step S125 that the scanning operation is ended, the flow advances to step S126 to detect the state of the 2nd release switch 130.

If it is determined in step S126 that the 2nd release switch 130 is not ON, the flow branches to step S127 to check the state of the 1st release switch 116. If it is determined in step S127 that the 1st release switch 116 is ON, the flow advances to step S126. Otherwise, the flow returns to step S111.

If it is determined in step S126 that the 2nd release switch 130 is ON, the flow advances to step S128 to select the shortest object distance from a plurality of obtained distance measurement results ($L_0$ to $L_n$) and set the selected distance as a distance $L_p$. In step S129, focusing is performed with respect to the distance $L_p$. In step S130, an exposure operation (photography) is performed with respect to a photographic film. With this operation, even if a main object 108 is not present in the center of the frame, a photograph of a human figure in focus can be taken.

If it is determined in step S131, the distance measurement result $L_0$ obtained by using the IRED 126 is smaller than 2 m, since it is unnecessary in terms of energy to cause the Xe tube 103 to emit a large amount of light, the flow does not return to step S123 in which distance measurement is performed upon emission of light from the Xe tube 103.

Figure 32:
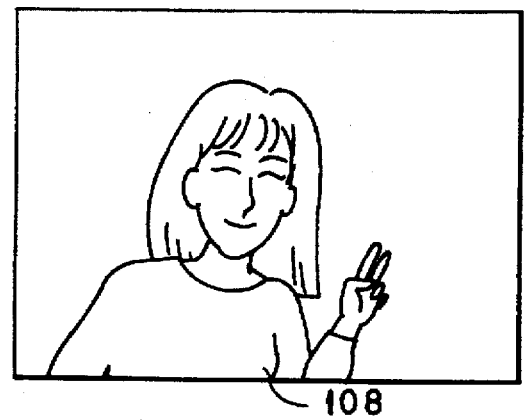
FIG. 32 is a view showing a scene where a human figure or the like is present immediately in front of the camera.

In the seventh embodiment, if an object is present in the center of the photographic frame and the object distance is less than 2 m, it is considered that the probability of a composition like the one shown in FIG. 32 is higher than that of a composition like the one shown in FIG. 28. In this case, distance measurement of portions other than a central portion of the frame is not performed.

As described above, in the seventh embodiment, unnecessary emission of light from the Xe tube is not performed with respect to a near object, thereby saving energy.

In addition, since the charging-up operations in steps S121 and S122 need not be performed, the problem of a release time lag can also be solved.

The eighth embodiment of the present invention will be described next.

Figure 34:
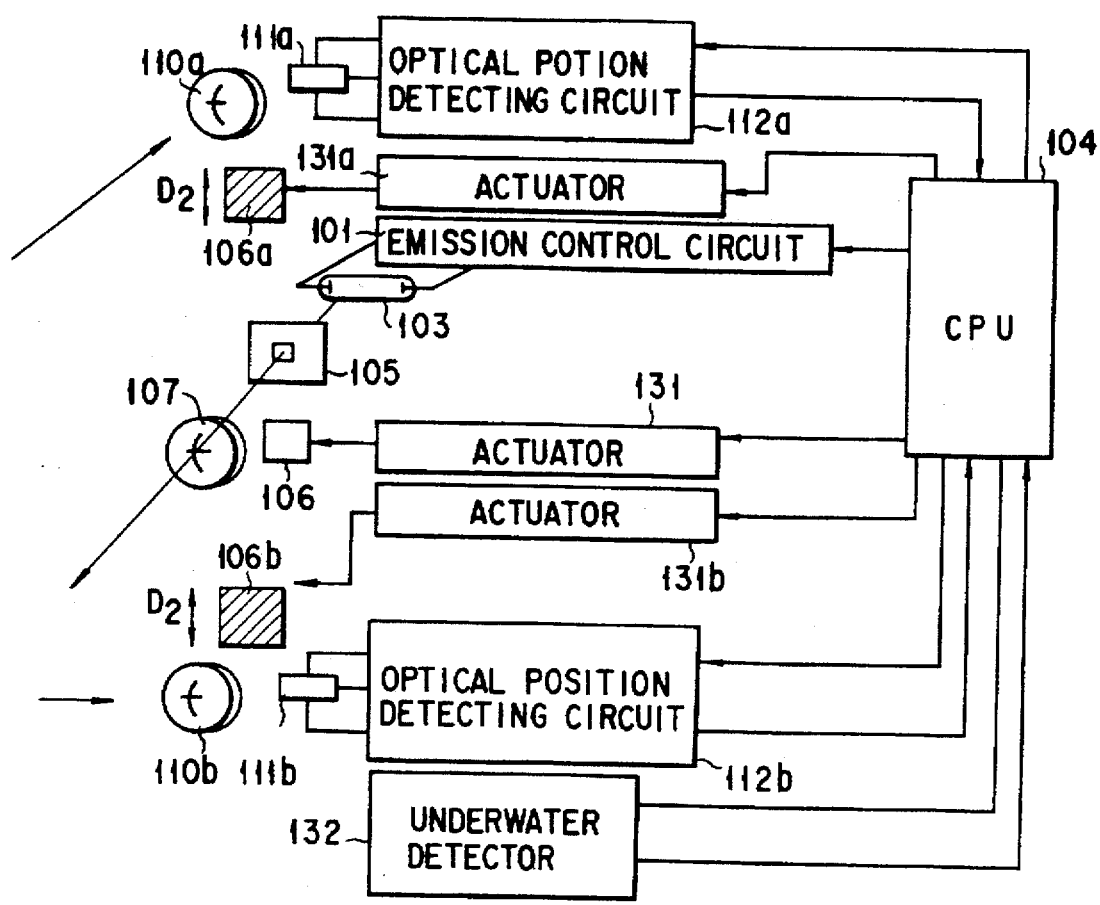
FIG. 34 is a block diagram showing the arrangement of a distance measuring device according to the eighth embodiment of the present invention.

FIG. 34 shows an arrangement of an underwater AF device using a large amount of light emitted from a Xe tube according to the eighth embodiment of the present invention.

In the water, since water molecules easily absorb light in the range of red to infrared beams, a light projection type AF device is rarely used. However, the application of this AF device to underwater AF is considered because of the characteristics of the AF device. That is, the amount of light in the range of red to infrared beams which can be emitted from the Xe tube by means of an electric discharge is ten times larger than that emitted from an IRED or the like. In addition, as shown in FIG. 25, the Xe tube emits strong light even in the visible region.

The same reference numerals in the embodiment shown in FIG. 34 denote the same parts as in the fifth to seventh embodiments (FIGS. 24, 27, and 31), and a description thereof will be omitted.

Similar to the embodiment shown in FIG. 24, a Xe tube 103 is controlled by a CPU 104 via an emission control circuit 101. Light emitted from the Xe tube 103 is radiated on an object via a mask 105 and a light-emitting lens 107. A visible light cut filter 106 is inserted in the optical path of light emitted from the Xe tube 103 to effectively use light in the visible region as well. The visible light cut filter 106 can be controlled to be inserted/removed in/from the optical path of emitted light by the CPU 104 via an actuator 131.

For the same purpose as that described above, visible light cut filters 106a and 106b which can be moved in the direction indicated by an arrow $D_2$ in FIG. 34 are inserted in the optical paths on the light-receiving side. These visible light cut filters 106a and 106b are controlled to be inserted/removed in/from the optical paths by the CPU 104 via actuators 131a and 131b.

When the CPU 104 determines on the basis of an output from an underwater detector 132 that the distance measuring device is in the water, the CPU 104 causes the visible light cut filters 106, 106a, and 106b to retreat from the optical paths via the actuators 131, 131a, and 131b. As a result, when the photographer performs a photographing operation underwater, the device can emit and receive light including light components having wavelengths which do not allow easy absorption of the light components in water. Therefore, even a distance, which cannot be measured by a conventional underwater distance measurement scheme using only infrared rays, can be measured.

In addition, on the ground, since the respective visible light cut filters are set in the optical paths, a dazzling effect on an object on the light-receiving side can be prevented. On the light-receiving side, visible light noise of sunbeams and the like can be advantageously reduced.

Figure 35:
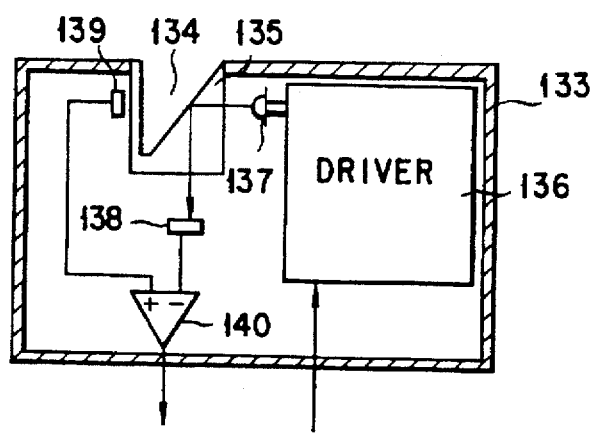
FIG. 35 is a view showing the detailed arrangement of an underwater detector.

FIG. 35 shows the detailed arrangement of the underwater detector 132 in FIG. 34.

Referring to FIG. 35, the outside of the underwater detector 132 is covered with a waterproof wall surface 133. A recess portion 134 is formed in part of the wall surface 133, and a prism 135 is arranged inside the recess portion 134. When an IRED 137 is caused to emit light via a driver 136, the light is received by two light-receiving elements (photodiodes (PDs)) 138 and 139. Outputs from the two light-receiving elements 138 and 139 are compared with each other by a comparator 140.

As shown in FIG. 35, an optical path is formed between the IRED 137 and the PD 138 under the condition of total reflection by the prism 135. For this reason, in a normal operation, light from the IRED 137 is not incident on the PD 139. However, when water enters the recess portion 134, the above condition of total reflection is not satisfied, the amount of light which is emitted from the IRED 137 and incident on the PD 138 decreases. In contrast to this, the amount of light which is emitted from the IRED 137 and incident on the PD 139 increases. As a result, an "H" signal which is at high level is output from the comparator 140 underwater.

In this manner, in the eighth embodiment, the positions of the visible light cut filters 106, 106a, and 106b are switched depending on whether the device is on the ground or in the water. Similar to the fifth to seventh embodiments described above, signal light emitted from the Xe tube 103 via the mask 105 and the light-emitting lens 107 is reflected by an object (not shown), and reflected light beams are incident on PSDs 111a and 111b via light-receiving lenses 110a and 110b. The CPU 104 then obtains an object distance L from the positions of the signal light beams according to equation (25).

As described above, in the eighth embodiment, distance measurement can be performed with a high precision both in the water and on the ground.

As has been described above, according to the fifth to eighth embodiments of the present invention, there is provided a light projection type distance measuring device for auto-focusing which provides countermeasures against slight movement of the emission point of a light source for light projection such as a xenon tube, and can perform distance measurement with respect to a long distance with a high precision without being influenced by the size of an object and changes in the amount of light emitted from the light source.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A distance measuring device for a camera, comprising:
   light-emitting means for projecting a distance measurement light beam toward an object to be photographed, said light-emitting means having a single light-emitting element;
   scanning means for sequentially scanning a projection direction of the distance measurement light beam projected from said light-emitting means;
   first light-receiving means, arranged at a position separated from said light-emitting means by a first base length, for receiving a reflected light beam of the distance measurement light beam from the object and outputting a first signal corresponding to an incident position of the reflected light beam;
   second light-receiving means, arranged at a position separated from said light-emitting means by a second base length, for receiving a reflected light beam of the distance measurement light beam from the object and outputting a second signal corresponding to an incident position of the reflected light beam; and object distance calculating means for calculating a distance to the object based on a plurality of distance measuring points in accordance with the first and second signals output from said first and second light-receiving means, respectively.

2. A device according to claim 1, wherein said first and second light-receiving means include two-dimensional semiconductor position sensing elements (PSDs).

3. A device according to claim 1, wherein said scanning means includes means for scanning the projection direction in a two-dimensional direction.

4. A device according to claim 1, wherein said object distance calculating means includes means for performing analog calculation of the object distance, and integrating an output result.

5. A device according to claim 1, wherein said scanning means scans the distance measurement light at least in a horizontal direction of said camera, and said second light-receiving means is arranged in a vertical direction of said camera.

6. A device according to claim 1, wherein when the reflected light beam of the distance measurement light from the object is not incident on one of said first and second light-receiving means, said object distance calculating means calculates the object distance in accordance with the one of the first and second output signals output from the one of said first and second light-receiving means on which the reflected light beam is incident, and information of the projection direction of the light from said light-emitting means.

7. A distance measuring device for a camera, comprising:
light-emitting means for emitting a distance measurement light beam toward an object to be photographed, said light-emitting beam having a single light-emitting element;
a pair of light-receiving means, arranged in a vertical direction of said camera, for detecting reflected signal positions of light beams, of the distance measurement light beam projected from said light-emitting means, which are reflected by the object;
scanning control means for performing a distance measuring operation while moving the distance measurement light beam projected from said light-emitting means in a horizontal direction of said camera; and
calculating means for calculating a distance to the object in accordance with outputs from said pair of light-receiving means.

8. A distance measuring device for a camera, comprising:
light-emitting means for emitting distance measurement light beam toward an object to be photographed, said light-emitting means having a single light-emitting element;
a pair of light-receiving means for detecting positions of signal light beams, of the distance measurement light beam projected from said light-emitting means, which are reflected by the object;
scanning control means for sequentially scanning a projection direction of the distance measurement light beam projected from said light-emitting means; and
calculating means for, when one reflected signal light beam of the distance measurement light beam projected from said light-emitting means is not incident on one of said pair of light-receiving means, calculating a distance to the object in accordance with the other reflected signal light position and information of a light-emitting direction of said light emitting-means.

9. A distance measuring device for a camera, comprising:
flash means for emitting flash light as distance measurement light toward an object to be photographed, said flash means forming a light beam using a portion of said emitted flash light and protecting the light beam as a distance measurement light beam to the object to be photographed;
first light-receiving means, arranged at a position separated from said flash means by a first base length, for receiving a reflected light beam of the distance measurement light beam from the object and outputting a first signal corresponding to an incident position of the reflected light beam;
second light-receiving means, arranged at a position separated from said flash means by a second base length, for receiving a reflected light beam of the distance measurement light beam from the object and outputting a second signal corresponding to an incident position of the reflected light beam; and
object distance calculating means for calculating a distance to the object in accordance with the first and second signals output from said first and second light-receiving means, respectively.

10. A device according to claim 9, further comprising scanning means for sequentially projecting part of the flash light from said flash means toward the object.

11. A device according to claim 9, further comprising light-emitting means for projecting distance measurement light in a specific direction, wherein said calculating means includes means for calculating an object distance in the specific direction in accordance with outputs from said first and second light-receiving means which correspond to the distance measurement light projected from said light-emitting means.

12. A device according to claim 11, further comprising emission control means for sequentially causing said flash means and said light-emitting means to emit light.

13. A distance measuring device comprising:
flash means for emitting flash light toward an object by consuming energy charged in a capacitor;
a pair of light-receiving means for detecting reflected signal light positions of signal light beams, of the flash light, which are reflected by the object; and
calculating means for calculating a distance to the object in accordance with outputs from said pair of light-receiving means.

14. A distance measuring device, comprising:
flash means for emitting a flash light beam toward an object by consuming energy charged in a capacitor;
scanning control means for sequentially radiating as a distance measurement light beam a part of the flash light beam on a plurality of points;
a pair of light-receiving means for receiving light incident from the object, said light-receiving means discriminating components based on background light in the received light so as to detect a position of reflected signal light from the object; and
calculating means for calculating a distance to the object in accordance with an output from said light-receiving means.

15. A device according to claim 14, wherein said scanning means includes a slit for transmitting the flash light beam.

16. A distance measuring device, comprising:
flash means for emitting flash light as distance measurement light toward an object whose distance is to be measured, said flash means forming a first light beam using a portion of said emitted flash light and protecting the first light beam to the object;

light-emitting means for emitting flash light as distance measurement light toward the object, said light-emitting means forming a second light beam using a portion of said emitted flash light and projecting the second light beam to the object;

a pair of light-receiving means for receiving reflected signal light beams from the object; and calculating control means for sequentially causing said flash means and said light-emitting element to emit flash light and for calculating a distance to the object in accordance with an output from said light-receiving means.

17. A device according to claim 16, wherein said light-emitting element includes a light-emitting diode.

18. A device according to claim 16, wherein a projection direction of the second distance measurement light beam from said light-emitting means is a fixed direction.

19. A device according to claim 16, wherein the second distance measurement light beam from said light-emitting means is used for distance measurement of a distance shorter than that of the distance measurement using the flash light projected by the flash means.

20. A device according to claim 16, further comprising scanning means, arranged in front of said flash means, for extracting part of the flash light beam and spatially scanning the extracted light beam.

21. An underwater distance measuring device for a camera, comprising:

flash means for emitting flash light to project distance measurement light toward an object to be photographed by consuming energy charged in a capacitor;

filter means, arranged in front of said flash means to freely retreat from an optical path of the distance measurement light, for cutting a visible light component of the distance measurement light;

actuator means for causing said filter means to retreat from the optical path of the distance measurement light when said camera is in the water, and inserting said filter means in the optical path of the distance measurement light when said camera is not in the water; and distance calculating means for receiving a light beam, of the distance measurement light emitted from said flash means, which is reflected by the object, and calculating a distance to the object.

22. A device according to claim 21, further comprising underwater detecting means for checking whether said camera is in the water, wherein said actuator means includes means for driving said filter means in accordance with a detection result obtained by said underwater detecting means.

23. A device according to claim 21, wherein said distance calculating means comprises:

first light-receiving means for receiving the reflected light beam and outputting a first signal corresponding to an incident position of the reflected light beam, and second light-receiving means for receiving the reflected light beam and outputting a second signal corresponding to an incident position of the reflected light beam, and wherein the object distance is detected in accordance with the first and second signals.

24. An underwater distance measuring device comprising:

flash means for emitting flash light to project distance measurement light toward an object to be measured by consuming energy charged in a capacitor; and light-receiving means for receiving a reflected signal light beam from the object and determining a distance to the object by using a visible light component of the reflected signal light beam.

25. A distance measuring device for a camera, comprising:

light-emitting means for projecting a distance measurement light beam onto an object to be photographed, said light-emitting means having a single light-emitting element;

a pair of light-receiving means for detecting incident positions of reflected signal light beams, of the distance measurement light beam projected from said light-emitting means, which are reflected by the object;

integrating means for integrating output results from said pair of light receiving means;

scanning control means for sequentially scanning a projection direction of the distance measurement light beam projected from said light-emitting means; and calculating means for calculating a distance in accordance with outputs from said pair of light-receiving means.

26. A distance measuring device for a camera, comprising:

light-emitting means for projecting distance measurement light beam onto an object to be photographed, said light-emitting means having a single light-emitting element;

a pair of light-receiving means for detecting positions of reflected signal light beams, of the distance measurement light beam projected from said light-emitting means, which are reflected by the object;

control means for sequentially switching a projection direction of the distance measurement light beam projected from said light-emitting means;

storage means for storing data corresponding to an error in a distance measurement result in the projection direction of the distance measurement light beam projected from said light-emitting means; and calculating means for calculating a distance to the object in accordance with outputs from said pair of light-receiving means, information of the projection direction of the distance measurement light beam projected from said light-emitting means, and data stored in said storage means.

* * * * *

UNITED STATES PATENT AND TRADEMARK OFFICE
CERTIFICATE OF CORRECTION

PATENT NO. : 5,680,648
DATED : October 21, 1997
INVENTOR(S) : NONAKA, Osamu

It is certified that error appears in the above-identified patent and that said Letters Patent is hereby corrected as shown below:

Column 26, line 5 (claim 9, line 5),

"protecting" should be --projecting--.

Column 27, line 2 (claim 16, line 5),

"protecting" should be --projecting--.

Signed and Sealed this

Fifth Day of May, 1998

*Attest:*

BRUCE LEHMAN

*Attesting Officer*     *Commissioner of Patents and Trademarks*